(12) United States Patent
Watanabe et al.

(10) Patent No.: US 6,785,607 B2
(45) Date of Patent: Aug. 31, 2004

(54) NAVIGATION SYSTEM, AND INFORMATION SERVER APPARATUS AND COMMUNICATION TERMINAL APPARATUS FOR THE SAME, AND METHOD AND PROGRAM FOR CHANGING A MOVABLE BODY IN THE SAME

(75) Inventors: Tomo Watanabe, Tsurugashima (JP); Tsuyoshi Sato, Tsurugashima (JP); Tamami Oda, Tsurugashima (JP); Yukitaka Saito, Tsurugashima (JP)

(73) Assignee: Pioneer Corporation, Tokyo-to (JP)

(*) Notice: Subject to any disclaimer, the term of this patent is extended or adjusted under 35 U.S.C. 154(b) by 0 days.

(21) Appl. No.: 10/237,978

(22) Filed: Sep. 10, 2002

(65) Prior Publication Data
US 2003/0069686 A1 Apr. 10, 2003

(30) Foreign Application Priority Data
Sep. 10, 2001 (JP) .................................... P2001-274184
Sep. 28, 2001 (JP) .................................... P2001-304362

(51) Int. Cl.[7] ............................ H04Q 7/20; G01C 21/00
(52) U.S. Cl. ....................... 701/200; 701/208; 340/988
(58) Field of Search ................................. 701/200, 201, 701/208, 24, 25, 202, 207, 210, 212; 455/414.3, 418, 566, 456.3, 456.2, 457; 340/988, 990; 342/357.08, 357.1, 357.12

(56) References Cited

U.S. PATENT DOCUMENTS

| 5,760,742 | A | | 6/1998 | Branch et al. ............ 342/457 |
|---|---|---|---|---|
| 6,026,149 | A | | 2/2000 | Fuller et al. ............ 379/88.21 |
| 6,169,902 | B1 | * | 1/2001 | Kawamoto ............... 455/456 |
| 6,314,295 | B1 | * | 11/2001 | Kawamoto ............... 455/456 |
| 6,317,684 | B1 | * | 11/2001 | Roeseler et al. ........... 701/202 |
| 6,324,467 | B1 | * | 11/2001 | Machii et al. ............. 701/200 |
| 6,334,087 | B1 | * | 12/2001 | Nakano et al. ............ 701/208 |
| 6,347,278 | B2 | * | 2/2002 | Ito ........................... 701/200 |
| 6,349,203 | B1 | * | 2/2002 | Asaoka et al. ............ 455/414 |

FOREIGN PATENT DOCUMENTS

| EP | 0 520 194 A2 | 12/1992 |
|---|---|---|
| EP | 1 130 358 A1 | 9/2001 |

* cited by examiner

Primary Examiner—Tan Q. Nguyen
Assistant Examiner—Dalena Tran
(74) Attorney, Agent, or Firm—Sughrue Mion, PLLC

(57) ABSTRACT

To provide a communication navigation system capable of operating a plurality of communication navigation terminal apparatuses in synchronization and switching among them while maintaining settings related to navigation. A navigation system is comprised of an information server apparatus, a portable terminal apparatus and a vehicle terminal apparatus for performing a navigation process, and when switching a movable body for performing the navigation, it switches a sending destination of navigation data such as map information, that is, a terminal apparatus while maintaining settings such as the destination information before connecting so as to continuously conduct the navigation such as route searching and route guidance.

29 Claims, 10 Drawing Sheets

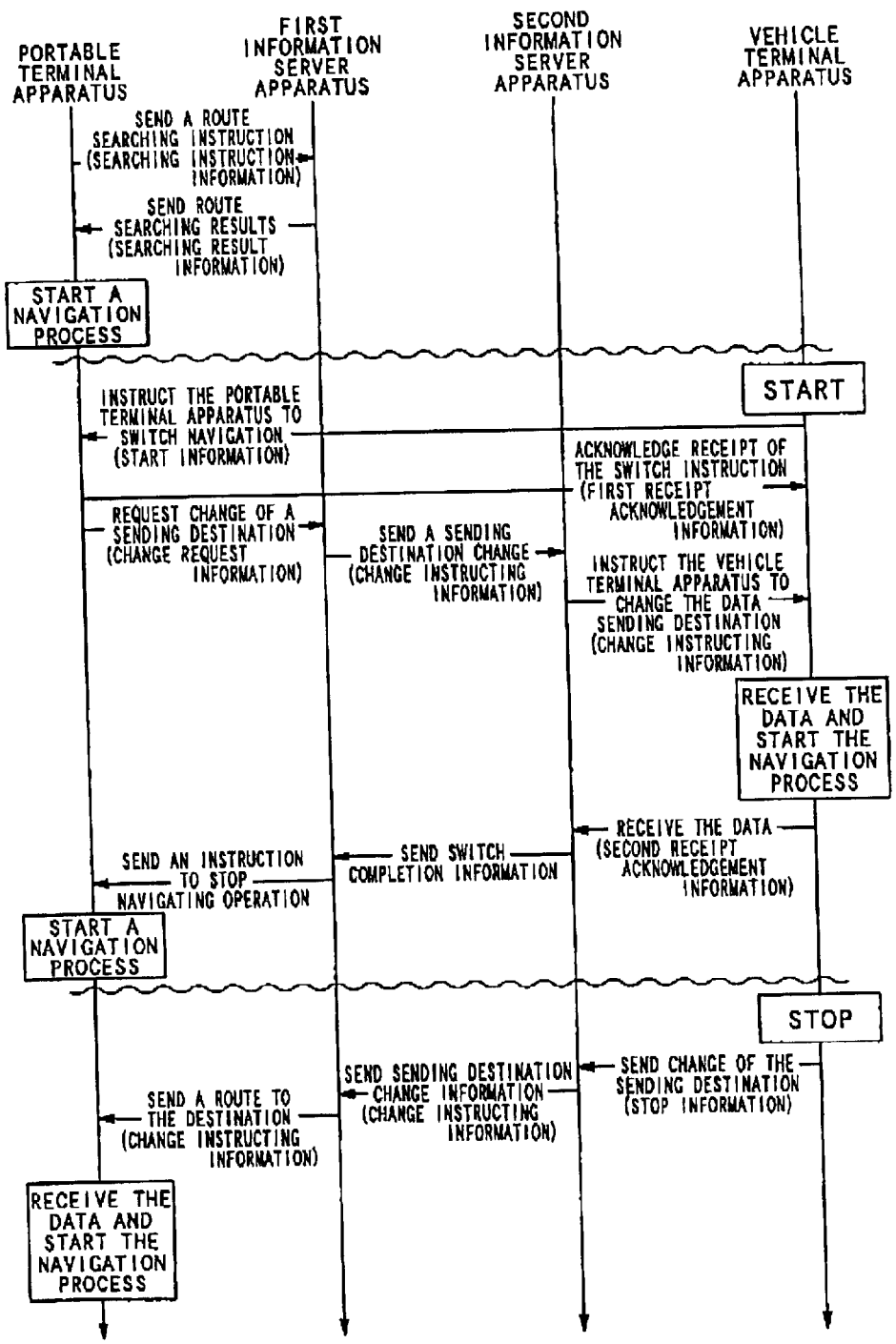

NAVIGATION SYSTEM, AND INFORMATION SERVER APPARATUS AND COMMUNICATION TERMINAL APPARATUS FOR THE SAME, AND METHOD AND PROGRAM FOR CHANGING A MOVABLE BODY IN THE SAME

BACKGROUND OF THE INVENTION

1. Field of the Invention

The present invention relates to a technical field of communication navigation and, more particularly, to the technical field of switching movable bodies to be a subject of the navigation.

2. Description of the Related Art

In recent years, a vehicle navigation apparatus for guiding travel of a vehicle by displaying a map on a display such as a liquid is crystal display panel mounted on the vehicle is widespread, and a research is underway lately toward practical use as to a communication navigation terminal apparatus for using an information server apparatus having a database of map information and a mobile communication line to distribute the map information to the vehicle navigation terminal apparatus so as to navigate the vehicle with vehicle data (movable body data) such as positional information obtained by the vehicle navigation terminal apparatus.

On the other hand, a research is also underway lately toward practical use as to a portable navigation terminal apparatus for, in a portable terminal apparatus such as a portable telephone, using a radio wave for performing communication to measure distances to a plurality of fixed telephone base stations and thereby obtain a position of the portable terminal apparatus so as to navigate a user having the portable terminal apparatus as with the vehicle communication navigation terminal apparatus.

On the other hand, while there is no problem in the case of navigating a user to a destination by the above-mentioned vehicle communication navigation terminal apparatus and portable communication navigation terminal apparatus as discrete apparatuses, there is presumably a problem that, in the case of using the vehicle communication navigation terminal apparatus or portable communication navigation terminal apparatus by switching between them, it is necessary to perform data setting such as destination setting for performing navigation for each apparatus and so it is not easy to switch between the apparatuses.

For instance, in the case where a parking lot is distant from an entrance of a destination and so the user has to walk to the final destination since an automobile cannot get there, or in the case of changing from walking to driving halfway to the destination, it is necessary to switch the communication navigation terminal apparatus for performing the navigation from the vehicle communication navigation terminal apparatus to the portable communication navigation terminal apparatus, or vice versa.

However, as for the vehicle communication navigation terminal apparatus and the portable communication navigation terminal apparatus in the past, the mutual communication navigation terminal apparatuses cannot operate in synchronization so that each of them required the data setting such as the destination setting to be performed.

SUMMARY OF THE INVENTION

The present invention has been conducted in consideration of the above problems, and its object is to provide the navigation terminal apparatus capable of, without inputting navigation data such as the destination setting each time the terminal apparatus to be used is switched, operating a plurality of the navigation terminal apparatuses in synchronization and easily switching between them.

The above object of the present invention can be achieved by a navigation system of the present invention comprising a fixedly installed information server apparatus and communication terminal apparatuses mounted one by one on a plurality of movable bodies for communicating with the information server apparatus via a mobile communication network, the system changing the movable bodies performing navigation by switching a connection between each of the communication terminal apparatuses and the information server apparatus. The information server apparatus is provided with: a receiving device for receiving information notifying at least either a start or a stop of any one of the plurality of communication terminal apparatuses; a connection controlling device for; based on the received information, performing at least any one of: connecting, as the communication terminal apparatus mounted on the movable body to be a subject of the navigation, any one of the communication terminal apparatuses to the information server apparatus; and disconnecting the communication terminal apparatus from the information server apparatus; and when performing the navigation with the connected communication terminal apparatus, data on the navigation before switching the connection is continuously used.

According to the present invention, the information server apparatus switches a communication terminal apparatus for performing the navigation based on a start or a stop of any one of a plurality of the communication terminal apparatuses, and when performing the navigation with the communication terminal apparatus switched from the information server apparatus, data on the navigation before switching the communication terminal apparatus is continuously used.

Thus, the data on the navigation before switching can be continuously used on the switched communication terminal apparatus, and so the navigation such as route searching and route guidance can be continuously performed in the case of having changed the movable body to another movable body before arriving at the destination so as to accurately guide the user to the destination without necessity to perform a troublesome operation such as setting data for performing the navigation when the movable body is changed.

In one aspect of the present invention, the system comprises a plurality of the information server apparatuses mutually connected; and each of the communication terminal apparatuses performs communication with any one of the information server apparatuses and also performs the navigation of the movable body, on which the connected communication terminal apparatus is mounted, by connecting to the information server apparatus for performing the communication.

According to this aspect, in the case where the communication terminal apparatus wherein the movable body is changed and the connection is switched is the one for communicating with other information server apparatuses, the communication terminal apparatus is connected to the other information server apparatuses by a connection device.

Therefore, in the case where the communication terminal apparatus having the connection switched and the information server apparatus for performing the navigation are different from the information server apparatus before switching the connection, that is, in the case where the navigation is performed for each information server apparatus by the communication terminal apparatus for communicating with the information server apparatus, the data on the navigation before switching can be continuously used on the switched communication terminal apparatus so as to accurately guide the user to the destination without necessity to perform a troublesome operation such as setting data for performing the navigation when the movable body is changed.

In another aspect of the present invention, the data includes at least any one of route searching data and destination data.

According to this aspect, at least either route searching data or destination data can be continuously used, and the route searching and route guidance can be continuously performed without necessity to perform a troublesome operation such as setting data for performing the navigation in the case of having changed the movable body to another movable body before arriving at the destination.

In further aspect of the present invention, the plurality of communication terminal apparatuses at least includes a vehicle communication terminal apparatus and a portable communication terminal apparatus.

According to this aspect, it is possible to perform the navigation with at least either the vehicle communication terminal apparatus or the portable communication terminal apparatus and the information server apparatus and also to switch the communication terminal apparatus for performing the navigation from the vehicle communication terminal apparatus to the portable communication terminal apparatus, or vice versa.

Therefore, in the case where a parking lot is distant from the destination and so the user has to walk to the destination since an automobile cannot get there, or in the case of changing from walking to driving halfway to the destination, it is possible to continuously perform the navigation with the vehicle communication terminal apparatus or the portable terminal apparatus so as to accurately guide the user to the destination without necessity to perform the troublesome operation such as setting for performing the navigation even if the movable body is changed from driving to walking or vice versa.

In further aspect of the present invention, a communication terminal apparatus to be a starting point of switching of the communication terminal apparatuses by the information server apparatus is the vehicle communication terminal apparatus.

According to this aspect, it is possible to switch the communication terminal apparatus for performing the navigation based on the start or stop of the vehicle communication terminal apparatus.

In further aspect of the present invention, in the case where the communication terminal apparatus is the vehicle communication terminal apparatus, the vehicle communication terminal apparatus comprises a sending device for at least sending information to notify the information server apparatus of a start of the vehicle communication terminal apparatus; and based on an engine start of a vehicle on which the vehicle communication terminal apparatus is mounted, the sending device sends the information to notify the start.

According to this aspect, in the case where the communication terminal apparatus is the vehicle communication terminal apparatus in the invention according to claim 6, the sending device sends to the above described information server apparatus at least information notifying a start of the vehicle communication terminal apparatus based on an engine start of the vehicle.

Therefore, it is possible to connect to or disconnect from the information server apparatus based on the engine start of the vehicle on which the vehicle communication terminal apparatus is mounted.

In further aspect of the present invention, in the case where the receiving device in the information server apparatus receives the information to notify the start of the vehicle communication terminal apparatus, the connection controlling device connects the vehicle communication terminal apparatus to the information server apparatus and disconnects other the communication terminal apparatuses from the information server apparatus.

According to this aspect, in the case where the communication terminal apparatus is the vehicle communication terminal apparatus, it is possible to connect the vehicle communication terminal apparatus to the information server apparatus based on the engine start of the vehicle on which the vehicle communication terminal apparatus is mounted.

In further aspect of the present invention, in the case where the communication terminal apparatus is the vehicle communication terminal apparatus, the vehicle communication terminal apparatus has a sending device for at least sending information to notify the information server apparatus of a stop of the vehicle communication terminal apparatus; and
based on an engine stop of a vehicle on which the vehicle communication terminal apparatus is mounted, the sending device sends the information to notify the stop.

According to this aspect, in the case where the communication terminal apparatus is the vehicle communication terminal apparatus, the sending device sends to the above described information server apparatus at least information notifying a stop of the vehicle communication terminal apparatus based on an engine stop of the vehicle.

Therefore, it is possible to connect the communication terminal apparatus to or disconnect it from the information server apparatus based on the engine stop of the vehicle on which the vehicle communication terminal apparatus is mounted.

In further aspect of the present invention, in the case where the receiving device in the information server apparatus receives the information to notify the stop of the vehicle communication terminal apparatus, the connection controlling device disconnects the vehicle communication terminal apparatus from the information server apparatus and connects one of other the communication terminal apparatuses to the information server apparatus.

According to this aspect, in the case where the communication terminal apparatus is the vehicle communication terminal apparatus, it is possible to connect any one of the other communication terminal apparatuses to the information server apparatus based on the engine stop of the vehicle on which the vehicle communication terminal apparatus is mounted.

The above object of the present invention can be achieved by an information server apparatus of the present invention included in a navigation system comprising a fixedly installed information server apparatus and communication terminal apparatuses mounted one by one on a plurality of movable bodies for communicating with the information server apparatus via a mobile communication network, the system changing the movable bodies performing navigation by switching a connection between each of the communication terminal apparatuses and the information server apparatus. The information server apparatus is provided with: a receiving device for receiving information notifying at least either a start or a stop of any one of the plurality of communication terminal apparatuses; a connection controlling device for, based on the received information, performing at least any one of: connecting, as the communication terminal apparatus mounted on the movable body to be a subject of the navigation, any one of the communication terminal apparatuses to the information server apparatus; and disconnecting the communication terminal apparatus from the information server apparatus; and when performing the navigation with the connected communication terminal apparatus, data on the navigation before switching the connection is continuously used.

According to the present invention, information notifying at least either the start or stop of any one of the communication terminal apparatuses is received, any one of the communication terminal apparatuses for performing the navigation is connected to the information server apparatus based on this information, so that the data on the navigation before switching the connection of the communication terminal apparatus is continuously used.

Thus, the data on the navigation before switching can be continuously used on the switched communication terminal apparatus, and so the navigation such as route searching and route guidance can be continuously performed in the case of having changed the movable body to another movable body before arriving at the destination so as to accurately guide the user to the destination without necessity to perform a troublesome operation such as setting data for performing the navigation when the movable body is changed.

In one aspect of the present invention, the apparatus is included in the navigation system including: a plurality of the information server apparatuses mutually connected, and each of the communication terminal apparatuses performs communication with any one of the information server apparatuses and thereby performs the navigation of any one of the plurality of movable bodies; and in the case where the communication terminal apparatus of which connection is to be switched by the connection controlling device is the one for performing the communication with another information server apparatus, the connection controlling device connects the communication terminal apparatus to the other information server apparatus.

According to this aspect, in the case where the communication terminal apparatus wherein the movable body is changed and the connection is switched is the one for communicating with other information server apparatuses, the communication terminal apparatus is connected to the other information server apparatuses by a connection device.

Therefore, in the case where the communication terminal apparatus having the connection switched and the information server apparatus for performing the navigation are different from the information server apparatus before switching the connection, that is, in the case where the navigation is performed for each information server apparatus by the communication terminal apparatus for communicating with the information server apparatus, the data on the navigation before switching can be continuously used on the switched communication terminal apparatus so as to accurately guide the user to the destination without necessity to perform a troublesome operation such as setting data for performing the navigation when the movable body is changed.

In another aspect of the present invention, the data at least includes either route searching data or destination data.

According to this aspect, at least either route searching data or destination data is continuously used.

Therefore, the route searching and route guidance can be continuously performed without necessity to perform a troublesome operation such as setting data for performing the navigation in the case of having changed the movable body to another movable body before arriving at the destination.

The above object of the present invention can be achieved by a communication terminal apparatus of the present invention included in a navigation system having a fixedly installed information server apparatus and communication terminal apparatuses mounted one by one on a plurality of movable bodies for communicating with the information server apparatus via a mobile communication network, the system changing the movable bodies performing navigation by switching a connection between each of the communication terminal apparatuses and the information server apparatus. The communication terminal apparatus is provided with a sending device for, on starting or stopping, sending to at least any one of the information server apparatus and the other communication terminal apparatus switching information for switching the connection to the information server apparatus to any one of the communication terminal apparatuses, and performs the navigation based on data on the navigation before switching the communication terminal apparatus in the case where the connection is switched to the communication terminal apparatus.

According to the present invention, in the case where the communication terminal apparatus starts or stops, switching information for switching the connection with the information server apparatus is sent at least to the information server apparatus or any one of the other communication terminal apparatuses on the start or stop of the communication terminal apparatus, and the navigation is performed based on the data on the navigation before switching the connection in the case where the connection is switched to the communication terminal apparatus.

Thus, it is possible to switch the connection of the communication terminal apparatus based on the start or stop thereof, and the data on the navigation before switching the communication terminal apparatus can be continuously used in the case where the switched communication terminal apparatus is the communication terminal apparatus so as to accurately guide the user to the destination without necessity to perform the troublesome operation such as setting for performing the navigation when the movable body is changed.

In one aspect of the present invention, the communication terminal apparatus is a vehicle communication terminal apparatus.

According to this aspect, it is possible to perform the navigation by the information server apparatus with at least either the vehicle communication terminal apparatus or the portable communication terminal apparatus and also to switch the communication terminal apparatus for performing the navigation from the vehicle communication terminal apparatus to the portable communication terminal apparatus, or vice versa.

Therefore, in the case where the parking lot is distant from the destination and so the user has to walk to the destination since an automobile cannot get there, or in the case of changing from walking to driving halfway to the destination, it is possible to continuously perform the navigation with the vehicle communication terminal apparatus or the portable terminal apparatus so as to accurately guide the user to the destination without necessity to perform the troublesome operation such as the setting for performing the navigation even if the movable body is changed from driving to walking or vice versa.

The above object of the present invention can be achieved by a communication terminal apparatus of the present invention included in a navigation system comprising a fixedly installed information server apparatus and communication terminal apparatuses mounted one by one on a plurality of movable bodies for communicating with the information server apparatus via a mobile communication network, the system changing the movable bodies performing navigation by switching a connection between each of the communication terminal apparatuses and the information server apparatus. The communication terminal apparatus is provided with: a receiving device for receiving information notifying at least either a start or a stop of the other communication terminal apparatus; a sending device for, on receiving the information, sending to at least any one of the information server apparatus and the other communication terminal apparatus switching information for switching the connection to the information server apparatus to any one of the communication terminal apparatuses, and performs the navigation based on data on the navigation before switching the communication terminal apparatus in the case where the connection is switched to the communication terminal apparatus.

According to the present invention, the above described other communication terminal apparatus receives the information notifying either the start or stop, and on receiving this information, the switching information for switching the connection with the information server apparatus to any one of the plurality of communication terminal apparatuses to be connected therewith is sent at least to either the information server apparatus or the other communication terminal apparatus, and the navigation is performed based on the above described data before switching the communication terminal apparatus in the case where the connection is switched to the communication terminal apparatus.

Thus, it is possible to switch the connection of the communication terminal apparatus based on the start or stop the other communication terminal apparatuses, and the data on the navigation before switching the communication terminal apparatus can be continuously used in the case where the switched communication terminal apparatus is the communication terminal apparatus so as to accurately guide the user to the destination without necessity to perform the troublesome operation such as the setting for performing the navigation when the movable body is changed.

In one aspect of the present invention, the communication terminal apparatus is a portable communication terminal apparatus.

According to this aspect, it is possible to switch the operation of the portable communication terminal apparatus for performing the navigation based on the start or stop of the other communication terminal apparatus and also to continuously use the data on the navigation on switching the operation to the portable communication terminal apparatus.

In another aspect of the present invention, the data includes at least any one of route searching data and destination data.

According to this aspect, at least either route searching data or destination data is continuously used.

Therefore, the route searching and route guidance can be continuously performed without necessity to perform a troublesome operation such as setting data for performing the navigation in the case of having changed the movable body to another movable body before arriving at the destination.

The above object of the present invention can be achieved by a method of the present invention of changing a movable body in a navigation system comprising a fixedly installed information server apparatus and communication terminal apparatuses mounted one by one on a plurality of movable bodies for communicating with the information server apparatus via a mobile communication network, the system changing the movable bodies performing navigation by switching a connection between each of the communication terminal apparatuses and the information server apparatus. The method includes: a notification process of notifying the information server apparatus of information on either a start or stop of any one of the plurality of communication terminal apparatuses; a connection process of performing at least any one of: connecting, as the communication terminal apparatus mounted on the movable body to be a subject of the navigation, any one of the communication terminal apparatuses to the information server apparatus; and disconnecting the communication terminal apparatus from the information server apparatus; and when performing the navigation with the connected communication terminal apparatus, data on the navigation before switching the connection is continuously used.

According to the present invention, the information server apparatus switches the communication terminal apparatus for performing the navigation based on the start or a stop of any one of the plurality of the communication terminal apparatuses, and when performing the navigation with the communication terminal apparatus switched by the information server apparatus, the data on the navigation before switching the communication terminal apparatus is continuously used.

Thus, the data on the navigation before switching can be continuously used on the switched communication terminal apparatus, and so the navigation such as route searching and route guidance can be continuously performed in the case of having changed the movable body to another movable body before arriving at the destination so as to accurately guide the user to the destination without necessity to perform a troublesome operation such as setting data for performing the navigation when the movable body is changed.

In one aspect of the information server apparatus is provided with a plurality of the information server apparatuses mutually connected for performing communication, and the communication terminal apparatuses performs the communication with any one of the information server apparatuses; the notification process notifies at least any one of the plurality of information server apparatus of information on either a start or stop of any one of the plurality of communication terminal apparatuses; and the connection process, based on the information, performs any one of: connecting, as the communication terminal apparatus mounted on the movable body to be a subject of the navigation, any one of the communication terminal apparatuses to the information server apparatus to be connected therewith or disconnecting the communication terminal apparatus from the information server apparatus connected therewith.

According to this aspect, in the case where the communication terminal apparatus wherein the movable body is changed and the connection is switched is the one for communicating with other information server apparatuses, the communication terminal apparatus is connected to the other information server apparatuses by the connection process.

Therefore, in the case where the communication terminal apparatus having the connection switched and the information server apparatus for performing the navigation are different from the information server apparatus before switching the connection, that is, in the case where the navigation is performed for each information server apparatus by the communication terminal apparatus for communicating with the information server apparatus, the data on the navigation before switching can be continuously used on the switched communication terminal apparatus so as to accurately guide the user to the destination without necessity to perform a troublesome operation such as setting data for performing the navigation when the movable body is changed.

In another aspect of the present invention, the data includes at least any one of route searching data and destination data.

Therefore, the route searching and route guidance can be continuously performed without necessity to perform a troublesome operation such as setting data for performing the navigation in the case of having changed the movable body to another movable body before arriving at the destination.

In further aspect of the present invention, the communication terminal apparatus for notifying the information by the notification step and connecting to or disconnecting from the information server apparatus by the connection step is at least a vehicle communication terminal apparatus and a portable communication terminal apparatus.

According to this aspect, it is possible to perform the navigation with at least either the vehicle communication terminal apparatus or the portable communication terminal apparatus and the information server apparatus and also to switch the communication terminal apparatus for performing the navigation from the vehicle communication terminal apparatus to the portable communication terminal apparatus, or vice versa.

Therefore, in the case where a parking lot is distant from the destination and so the user has to walk to the destination since an automobile cannot get there, or in the case of changing from walking to driving halfway to the destination, it is possible to continuously perform the navigation with the vehicle communication terminal apparatus or the portable terminal apparatus so as to accurately guide the user to the destination without necessity to perform the troublesome operation such as setting for performing the navigation even if the movable body is changed from driving to walking or vice versa.

In further aspect of the present invention, the communication terminal apparatus for notifying the information by the notification step is the vehicle communication terminal apparatus.

According to this aspect, it is possible to perform the navigation with at least either the vehicle communication terminal apparatus or the portable communication terminal apparatus and the information server apparatus and also to switch the communication terminal apparatus for performing the navigation from the vehicle communication terminal apparatus to the portable communication terminal apparatus, or vice versa.

Therefore, in the case where a parking lot is distant from the destination and so the user has to walk to the destination since an automobile cannot get there, or in the case of changing from walking to driving halfway to the destination, it is possible to continuously perform the navigation with the vehicle communication terminal apparatus or the portable terminal apparatus so as to accurately guide the user to the destination without necessity to perform the troublesome operation such as setting for performing the navigation even if the movable body is changed from driving to walking or vice versa.

BRIEF DESCRIPTION OF THE DRAWINGS

FIG. 10 is another sequence diagram showing the connection processing of the information server apparatus, the portable terminal apparatus and the vehicle terminal apparatus according to this embodiment.

DETAILED DESCRIPTION OF THE PREFERRED EMBODIMENTS

Next, preferred embodiments of the present invention will be described based on the drawings.

Moreover, the embodiments described below are those in the case where the present invention is applied to a navigation system comprised of an information server apparatus, a vehicle communication navigation terminal apparatus and a portable communication navigation terminal apparatus.

I. Overview Configuration and Operation

First, overview configuration and operation of the navigation system according to this embodiment will be described by using FIG. 1.

Figure 1:
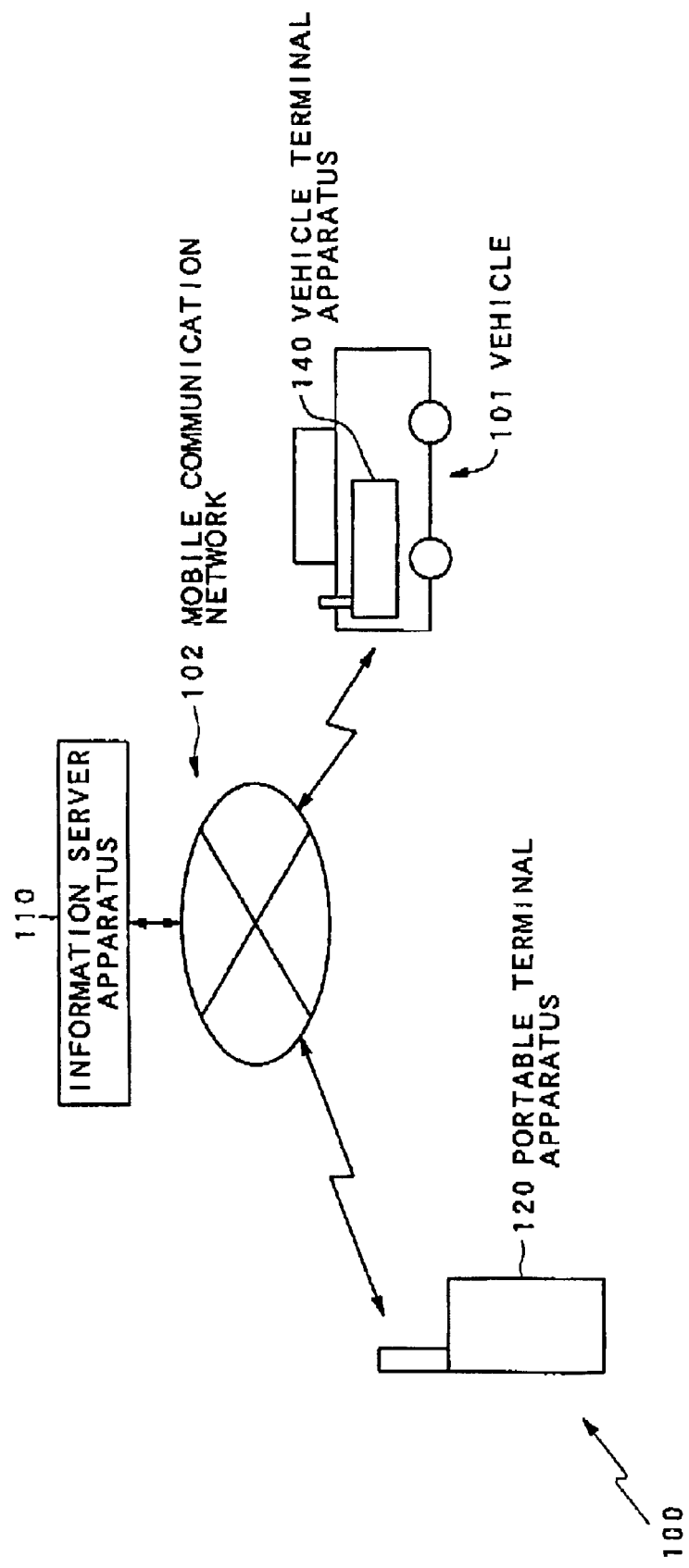
FIG. 1 is a block diagram showing an overview configuration of a navigation system according to an embodiment related to the present invention.

Moreover, FIG. 1 is a block diagram showing an overview configuration of navigation related to this embodiment.

As shown in FIG. 1, a navigation system 100 according to this embodiment is comprised of an information server apparatus 110 for performing a process of the navigation, a portable telephone (movable body (hereafter, referred to as the portable terminal apparatus)) 120 having a portable communication navigation function, and a vehicle communication navigation terminal apparatus (hereafter, referred to as the vehicle terminal apparatus) 140 mounted on a vehicle 101 (movable body), wherein the information server apparatus 110, portable terminal apparatus 120 and the vehicle terminal apparatus 140 are mutually connected by establishing a communication line with a mobile communication network 102 such as a public switched telephone network circuit and the Internet.

Moreover, the portable terminal apparatus 120 and the vehicle terminal apparatus 140 are connected to the mobile communication network 102 via a base station which is not shown, for instance.

The information server apparatus 110 is fixedly installed at a predetermined place, and is capable of performing a navigation process by obtaining the information on the movable body (hereafter, referred to as movable body data) from the portable terminal apparatus and the movable body of the vehicle 101.

The portable terminal apparatus 120 performs the navigation process with the information server apparatus 110 by using communication, and navigates an operator having the portable terminal apparatus 120 by performing the navigation process with the information server apparatus 110.

To be more specific, the portable terminal apparatus 120 sends to the information server apparatus 110 movable body data such as inputted destination information, positional information obtained based on the communication with a fixed base station not shown, traveling direction information and speed information, and receives the data navigation-processed (hereafter, referred to as navigation data) based on this movable body data such as information on route searching results and information for performing route guidance so as to perform the navigation.

The vehicle terminal apparatus 140 performs the navigation process with the information server apparatus 110 by using the communication just as the portable terminal apparatus 120, and navigates the vehicle 101 by performing the navigation process with the information server apparatus 110.

To be more specific, the vehicle terminal apparatus 140 sends to the information server apparatus 110 the positional information on the vehicle obtained by receiving the data Global Positioning System (OPS) and the movable body data obtained by a speed pulse, an acceleration sensor, an oscillation sensor, a gyroscope and so on, and also receives the navigation data so as to perform the navigation.

Moreover, the movable body data includes the positional information, traveling direction information and speed information, and the navigation data includes the destination information, map information and route information. In addition, the movable body data and the navigation data constitute the data on the navigation related to the present invention.

In addition, the navigation system 100 switches a connection of the communication line with the information server apparatus 110 between the portable terminal apparatus 120 and the vehicle terminal apparatus 140 so as to perform the navigation of a subject movable body with either the portable terminal apparatus 120 or the vehicle terminal apparatus 140 and the information server apparatus 110. To be more specific, when one of the portable terminal apparatus 120 and the vehicle terminal apparatus 140 is performing the navigation process with the information server apparatus 110, the other one cannot do so.

Furthermore, in the navigation system 100 according to this embodiment, the portable terminal apparatus 120 and the vehicle terminal apparatus 140 are registered with the information server apparatus 110 in advance, and selection of one of them, that is, switching (hereafter, merely referred to as connection processing) of the communication line between either the portable terminal apparatus 120 or vehicle terminal apparatus 140 and the information server apparatus 110 is performed based on information notifying a start (hereafter, referred to as start information) and information notifying a stop (hereafter, referred to as stop information) of the vehicle terminal apparatus 140.

To be more specific, when the information server apparatus 110 receives the start information and stop information sent from the vehicle terminal apparatus 140 directly or via the portable terminal apparatus 120, it changes a destination of the navigation data such as the map information, that is; the movable body for performing the navigation while maintaining settings in the navigation process such as the destination information and route searching information before the connection.

This embodiment allows, by having such a configuration, to obtain the navigation data before switching in the terminal apparatus to be switched when switching the subject of the navigation, so that the navigation such as the route searching and route guidance can be continuously performed in the case of having changed the movable body to another movable body before arriving at the destination.

II. Configurations of the Apparatuses

Next, the configurations of the information server apparatus 110, portable terminal apparatus 120 and the vehicle terminal apparatus 140 will be described by using FIGS. 2 to 4.

Figure 2:
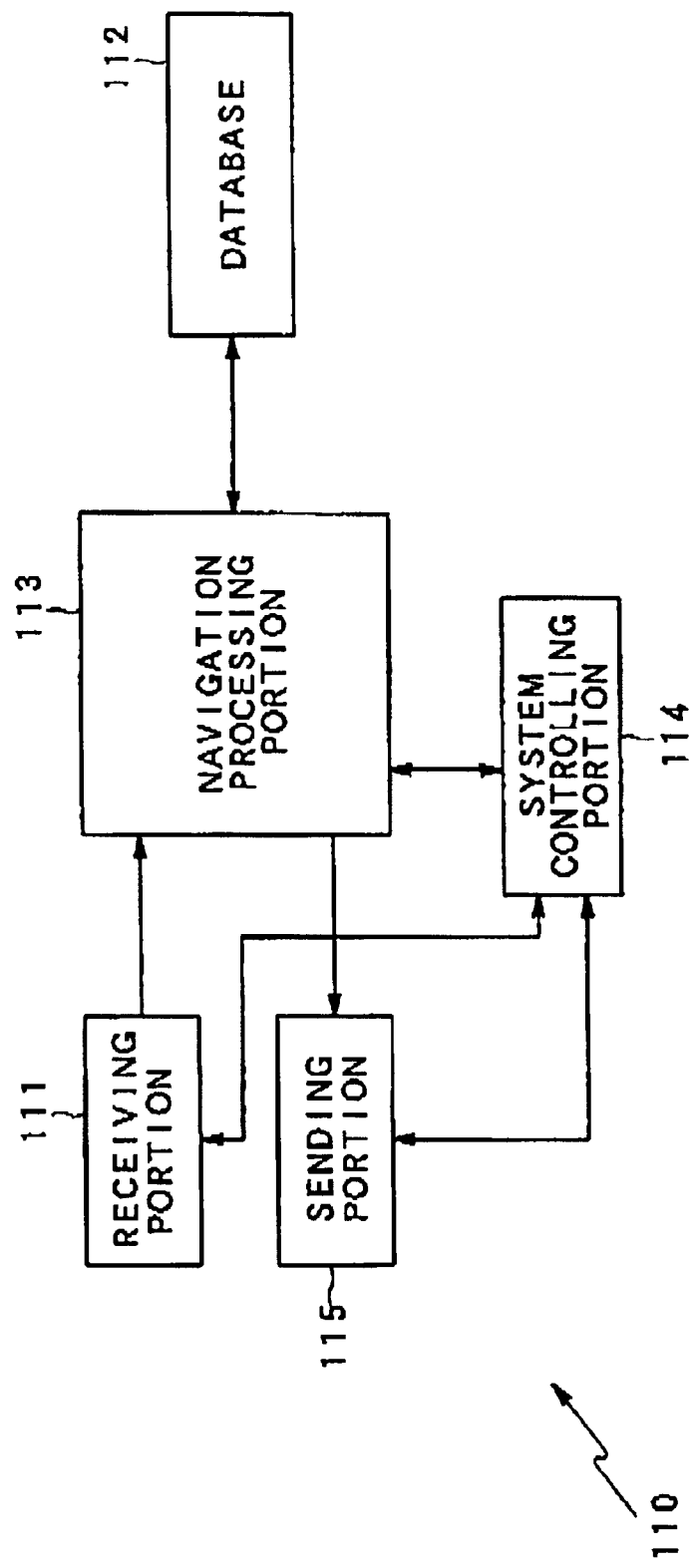
FIG. 2 is a block diagram showing configuration of an information server apparatus according to this embodiment.
Figure 3:
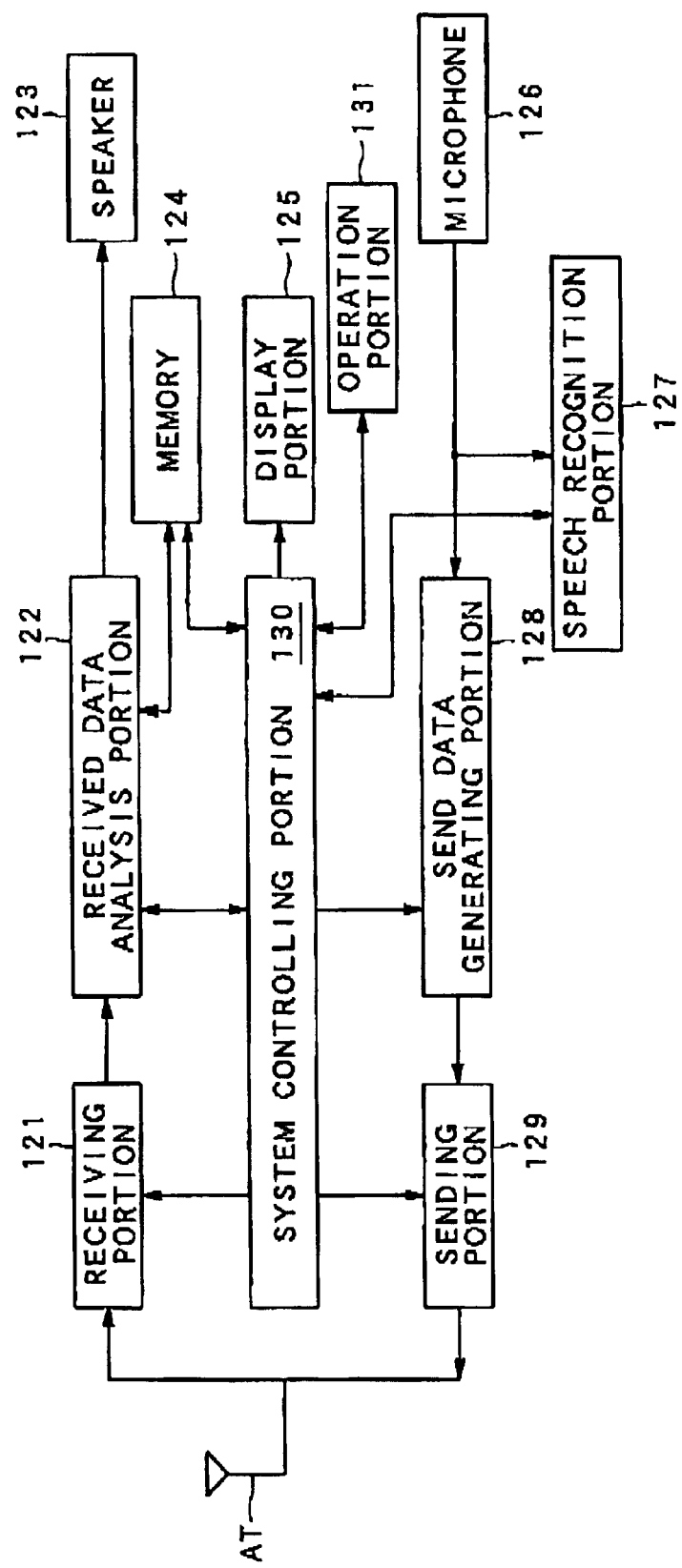
FIG. 3 is a block diagram showing configuration of a portable terminal apparatus according to this embodiment.

Moreover, FIG. 2 is a block diagram showing the configuration of the information server apparatus, and FIG. 3 is a block diagram showing the configuration of the portable terminal apparatus. In addition, FIG. 4 is a block diagram showing the configuration of the vehicle terminal apparatus.

First, the configuration of the information server apparatus 110 will be described by using FIG. 2.

The information server apparatus 110 shown in FIG. 2 has a receiving portion 111 for receiving the data sent from the portable terminal apparatus 120 and the vehicle terminal apparatus 140 via the mobile communication network 102, a navigation processing portion 113 for performing the navigation process with the map information stored in a database 112 based on the received data, a system controlling portion 114 for controlling the portions in the information server apparatus 110 and also controlling the connection processing with the portable terminal apparatus 120 and the vehicle terminal apparatus 140 based on the received data, and a sending portion 115 for sending the navigation data and the data for controlling the connection processing (hereafter, referred to as communication controlling data) to the portable terminal apparatus 120 and the vehicle terminal apparatus 140.

The receiving portion 111 receives via the mobile communication network 102 the movable body data of the portable terminal apparatus 120 and the vehicle terminal apparatus 140 such as the movable body data including the positional information, the destination information, traveling direction information and speed information on the portable terminal apparatus 120 or the vehicle 101 having them mounted thereon and the navigation data including the destination information, and also receives the communication controlling data for controlling the communication with the apparatuses, such as the navigation process with the portable terminal apparatus 120 and the vehicle terminal apparatus 140 and the start/stop information on the vehicle terminal apparatus 140 so as to output the received movable body data and navigation data to the navigation processing portion 113 and the communication controlling data to the system controlling portion 114 respectively.

The database 112 is connected to the navigation processing portion 113, and the database 112 has road information such as the map information and traffic jam information and additional information such as store information and parking information stored therein.

In addition, the database 112 searches such various kinds of data according to an instruction of the navigation processing portion 113, and outputs the search results to the navigation processing portion 113.

Moreover, various kinds of data stored in the database 112 are updated at any time by an input portion and so on not shown.

The navigation processing portion 113 performs the navigation process based on an instruction of the system controlling portion 114.

To be more specific, the navigation processing portion 113 searches the database 112 based on the received movable body data and navigation data, obtains predetermined data to perform the navigation process such as the route searching and route guidance of the movable body on which the portable terminal apparatus 120 or the vehicle terminal apparatus 140 is mounted, and sends the navigation data on the route searching results or route guidance to the portable terminal apparatus 120 and the vehicle terminal apparatus 140 via the sending portion 115.

The system controlling portion 114 controls the portions in the information server apparatus 110, that is, the receiving portion 111, navigation processing portion 113 and sending portion 115 based on the received communication controlling data, and also controls the communication with the portable terminal apparatus 120 and the vehicle terminal apparatus 140.

To be more specific, the system controlling portion 114 establishes the communication line with the portable terminal apparatus 120 or the vehicle terminal apparatus 140 for performing the navigation based on the start or stop information on the vehicle terminal apparatus 140 inputted via the receiving portion 111, and also disconnects the communication line with the vehicle terminal apparatus 140 or the portable terminal apparatus 120 not performing the navigation. The operation of connecting the communication line with the portable terminal apparatus 120 and the vehicle terminal apparatus 140 in the system controlling portion 114 will be described later.

The sending portion 115 sends the navigation data and the communication controlling data outputted from the navigation processing portion 113 and the system controlling portion 114 to the portable terminal apparatus 120 and the vehicle terminal apparatus 140 based on the instruction of the system controlling portion 114.

Next, the configuration of the portable terminal apparatus 120 will be described by using FIG. 3.

The portable terminal apparatus 120 shown in FIG. 3 has a receiving portion 121 connected to an antenna AT for receiving voice data of calls and so on and the data sent from the information server apparatus 110 or the vehicle terminal apparatus 140, a received data analysis portion 122 for analyzing the type of data and outputting it to each of predetermined portions, a speaker 123 for amplifying received voice data, a memory 124 for storing the received data, a display portion 125 for displaying the navigation data, a microphone 126 for inputting voice, a speech recognition portion 127 for recognizing inputted voice, a send data generating portion 128 for generating send data based on the inputted voice, a sending portion 129 for sending the send data, communication controlling data and navigation data to the information server apparatus 110 or the vehicle terminal apparatus 140, a system controlling portion 130 for controlling the portions based on the data received or stored in the memory 124 and also controlling the connection processing with the portable terminal apparatus 120 and the vehicle terminal apparatus 140 based on this data, and an operation portion 131 for operating the respective portions.

The receiving portion 121 receives the navigation data such as the route searching results, route guidance and map information in conjunction therewith sent from the information server apparatus 110 via the mobile communication network 102, and also receives the communication controlling data for performing communication control such as start/stop information on the vehicle terminal apparatus 140 and also controlling the navigation process with the information server apparatus 110 and the vehicle terminal apparatus 140 so as to output the received data to the received data analysis portion 122.

The received data analysis portion 122 has the data received by the receiving portion 121 inputted, and obtains the voice data, communication control data and navigation data from the inputted data, and also outputs the voice data to the speaker 123 and communication controlling data and the navigation data to the memory 124 and the system controlling portion 130.

The memory 124 has the received navigation data and communication controlling data stored therein, and also stores the movable body data of the portable terminal apparatus 120 obtained from a fixed base station not shown and the navigation data such as the destination information inputted from the operation portion 131, so that the information outputted to or from the system controlling portion 130 is written thereto according to the instruction of the system controlling portion 130.

The display portion 125 displays various necessary states such as the map information obtained by the received data analysis portion 122 and driving guidance in the vehicle terminal apparatus 140.

The send data generating portion 128 has the voice data converted into the data by the microphone 126 inputted thereto, and generates the send data based on the inputted voice data so as to send the voice data via the sending portion 129.

The sending portion 129 sends the navigation data and the communication controlling data outputted from the system controlling portion 130 and the obtained movable body data of the portable terminal apparatus 120 to the information server apparatus 110 and the vehicle terminal apparatus 140 based on the instruction of the system controlling portion 130.

The system controlling portion 130 includes various input-output ports (such as a key input port, a display portion control port and so on) in parallel with the above-mentioned operation so as to control the communication and the navigation process between the information server apparatus 110 and the vehicle terminal apparatus 140 performed via the receiving portion 121 and the sending portion 129.

In addition, the system controlling portion 130 exerts control to display the traveling route guidance information on a map showing a surrounding area including a current position of the portable terminal apparatus in the display portion 125 based on the navigation data obtained from the information server apparatus 110.

The operation portion 131 is comprised of a large number of keys such as various check buttons and numeral keys, intended to input the movable body data and an instruction of the operator such as the instruction to display the inputted destination information for instance.

Lastly, the configuration of the vehicle terminal apparatus 140 will be described by using FIG. 4.

Figure 4:
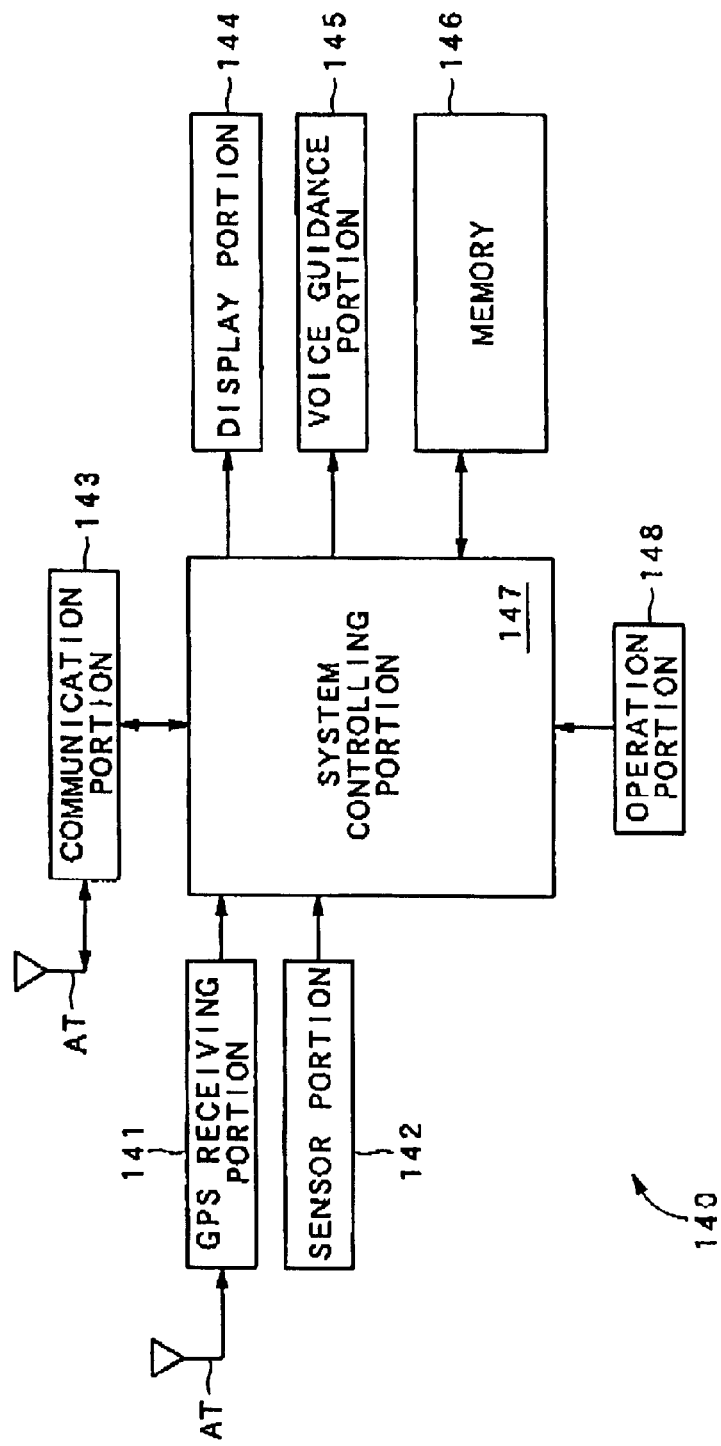
FIG. 4 is a block diagram showing configuration of a vehicle terminal apparatus according to this embodiment.

The vehicle terminal apparatus 140 shown in FIG. 4 has a GPS receiving portion 141 connected to the antenna AT for receiving GPS data, a sensor portion 142 comprised of a speed/acceleration sensor for sensing traveling speed and acceleration of the vehicle and an azimuth sensor for sensing an azimuth of the vehicle, a communication portion 143 connected to the antenna AT for communicating the data sent from the information server apparatus 110 or the portable terminal apparatus 120, a display portion 144 for displaying the navigation data together with the map information, a voice guidance portion 145 for performing the route guidance of the vehicle by voice based on the received navigation data, a memory 146 for temporarily storing the data such as the received navigation data, a system controlling portion 147 for controlling the display portion 144 and the voice guidance portion 145 based on the data received or stored in the memory 146 and sending the start and stop of the vehicle terminal apparatus 140 as the communication controlling data to the information server apparatus 110 via the communication portion 143, and an operation portion 148 for operating the respective portions.

The GPS receiving portion 141 receives navigation waves from a plurality of artificial satellites belonging to a GPS via the antenna AT, and calculates a pseudo coordinate value of the current position and outputs it as GPS data to the system controlling portion 147.

The sensor portion 142 senses the traveling speed of the vehicle, and converts the sensed speed into speed data having a form of a pulse or a voltage to output it to the system controlling portion 147. In addition, the sensor portion 142 compares gravitational acceleration (its direction) and the acceleration (its direction) generated by travel of the vehicle to sense a travel state thereof in a vertical direction so as to convert the acceleration data showing the sensed travel state into the form of a pulse or a voltage and output it to the system controlling portion 147.

Furthermore, the sensor portion 142 has a so-called gyro-sensor, and senses the azimuth of the vehicle, that is, the traveling direction in which the vehicle is advancing to convert the sensed azimuth into azimuth data having the form of a pulse or a voltage so as to output it to the system controlling portion 147.

The communication portion 143 receives the navigation data such as the route searching results, route guidance and map information in conjunction therewith sent from the information server apparatus 110 via the mobile communication network 102, and also receives the communication controlling data in controlling the navigation process and communication between the information server apparatus 110 and the portable terminal apparatus 120 so as to output the received data to the system controlling portion 147.

In addition, the communication portion 143 sends the navigation data, communication controlling data and movable body data outputted from the system controlling portion 147 to the information server apparatus 110 and the portable terminal apparatus 120 based on the instruction of the system controlling portion 114.

The display portion 144 displays various necessary states such as the map information received by the communication portion 143 and the driving guidance in the vehicle terminal apparatus 140.

The voice guidance portion 145 outputs in the form of voice the navigation data such as the route searching results and guidance information including the traveling direction of the vehicle at a next intersection and the information to be notified to a driver (traffic jam information, closed road information or the like) in the driving guidance.

The system controlling portion 147 includes various input-output ports (such as a GPS reception port, a key input port, a display portion control port and so on) in parallel with the above-mentioned operation so as to control the communication and the navigation process between the information server apparatus 110 and the portable terminal apparatus 120 performed via the communication portion 143 and control the portions.

In addition, the system controlling portion 147 exerts control to display the traveling route guidance information on the map showing the surrounding area including the current position of the vehicle in the display portion 144 based on the navigation data obtained from the information server apparatus 110, and also exerts control to have the traveling route guidance information and so on outputted by voice from the voice guidance portion 145.

III. Conne Processing

Next, a description will be given by using FIGS. 5 to 8 as to the operation of the apparatuses when switching between the information server apparatus 110 and the portable terminal apparatus 120 or the vehicle terminal apparatus 140, that is, the connection according to this embodiment.

Figure 5:
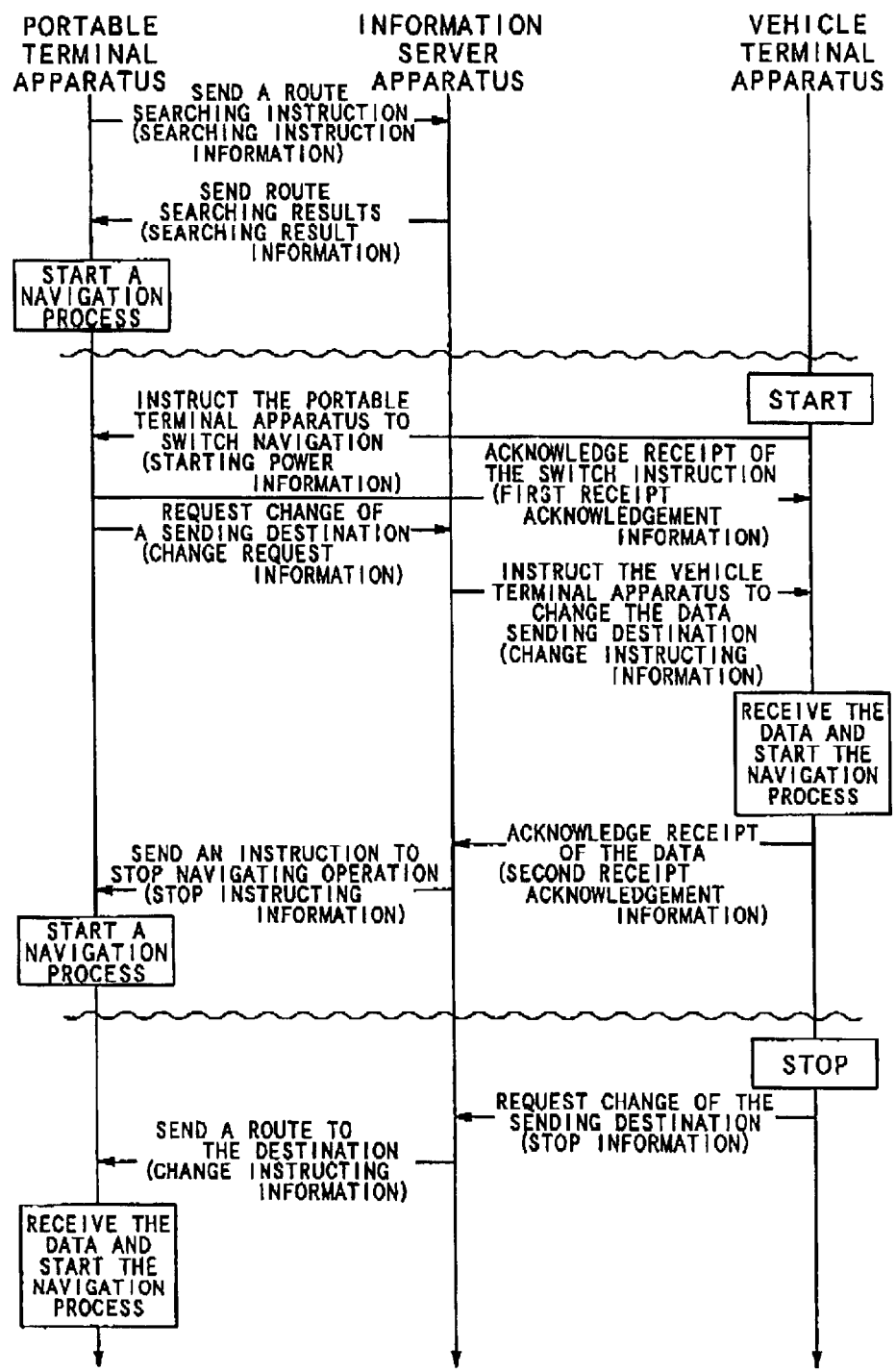
FIG. 5 is a sequence diagram showing connection processing of the information server apparatus, the portable terminal apparatus and the vehicle terminal apparatus according to this embodiment.
Figure 6:
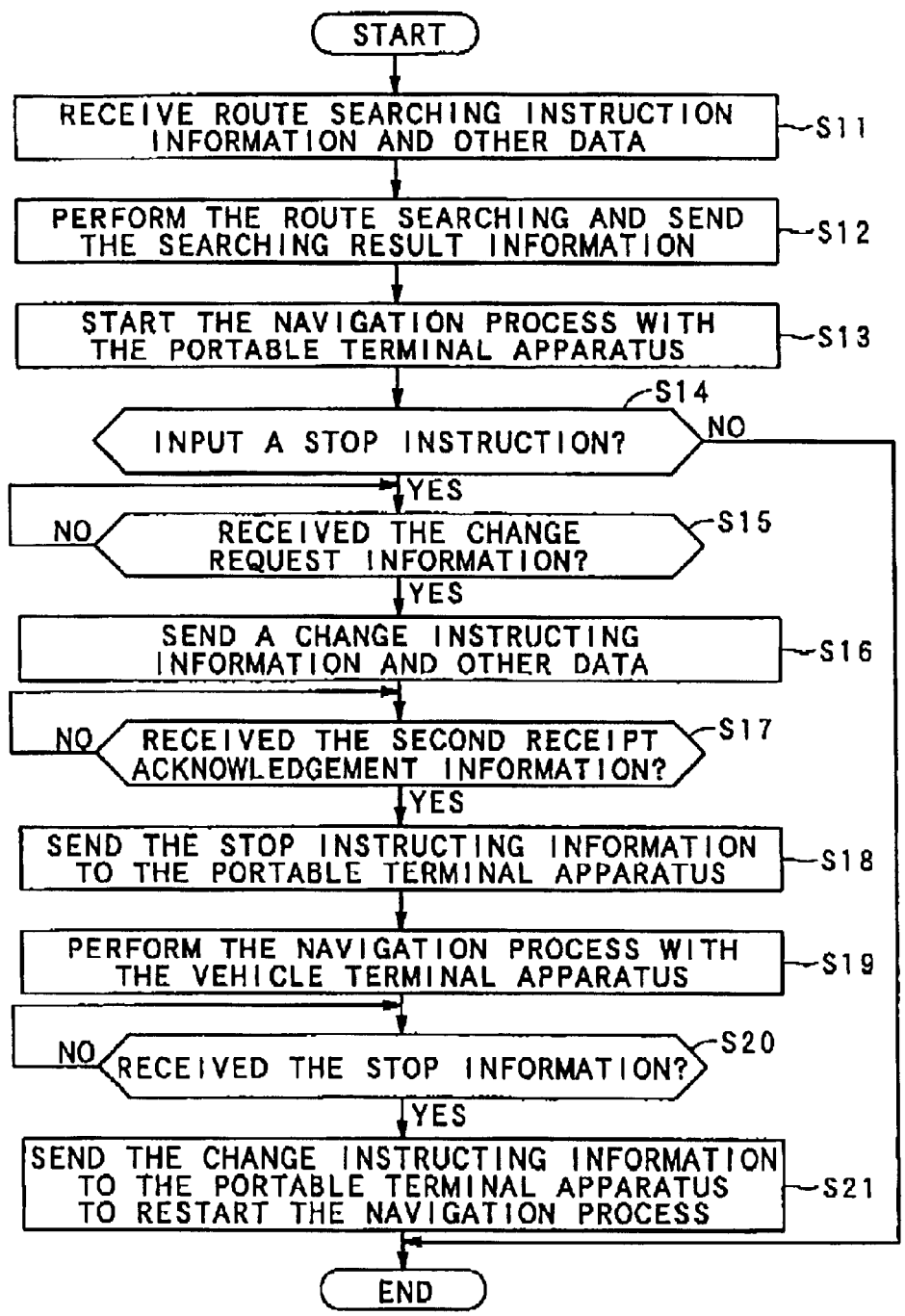
FIG. 6 is a flowchart showing the connection processing of the information server apparatus according to this embodiment.
Figure 7:
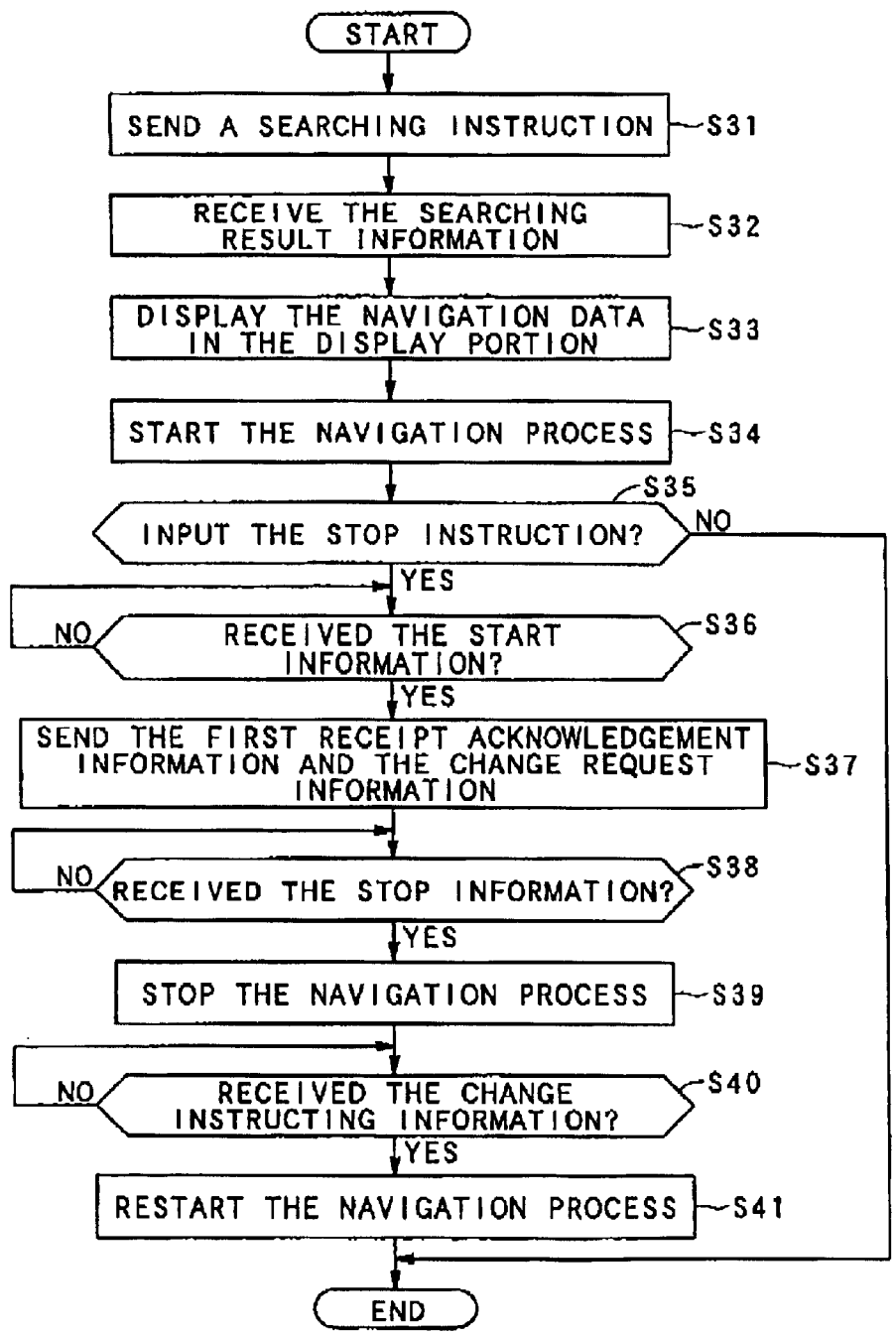
FIG. 7 is a flowchart showing the connection processing of the portable terminal apparatus according to this embodiment.
Figure 8:
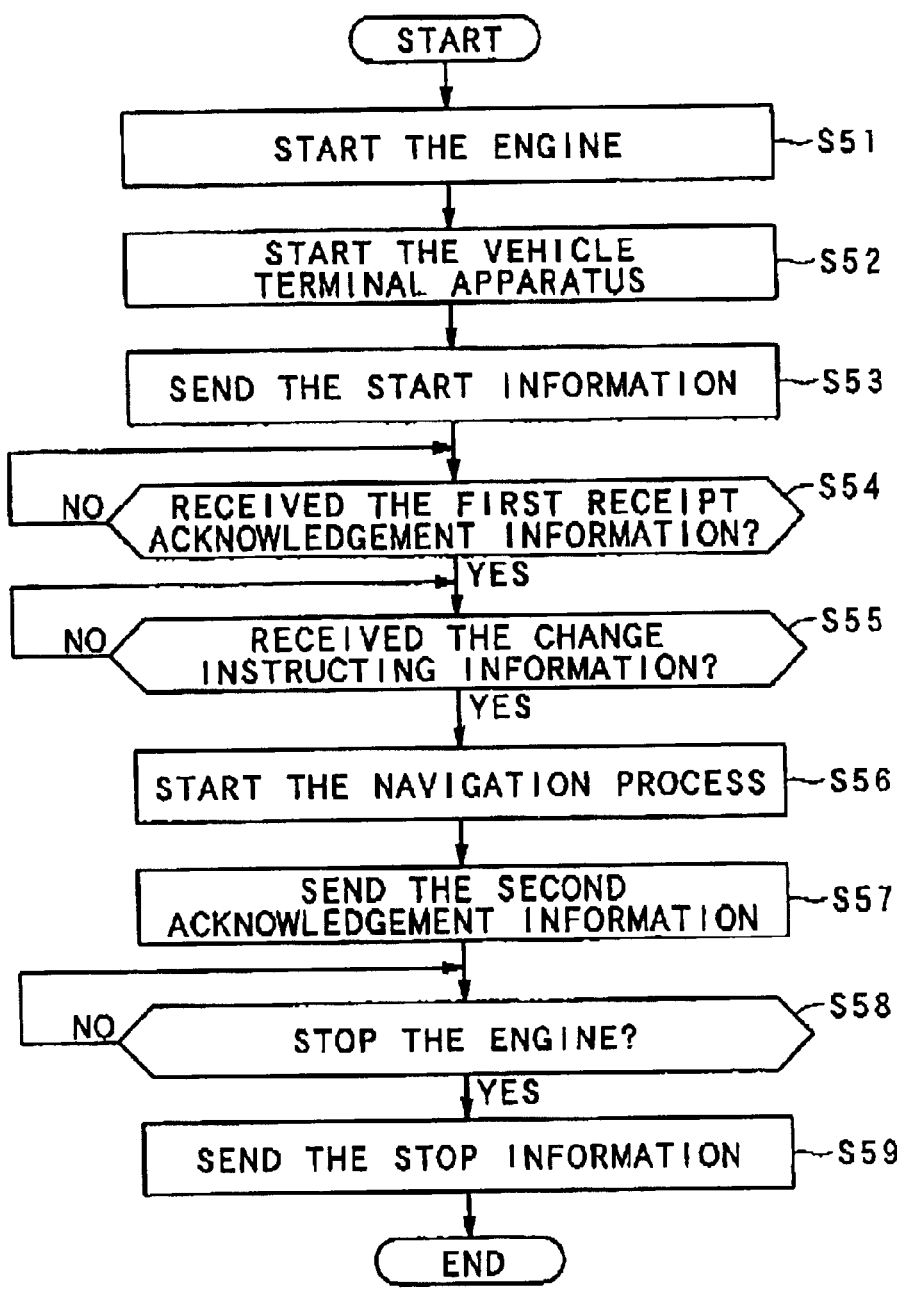
FIG. 8 is a flowchart showing the connection processing of the vehicle terminal apparatus according to this embodiment.

Moreover, FIG. 5 is a sequence diagram showing the processes of the information server apparatus 110, the portable terminal apparatus 120 and the vehicle terminal apparatus 140 in the connection processing, and FIGS. 6, 7 and 8 are flowcharts showing the respective processes of the information server apparatus 110, the portable terminal apparatus 120 and the vehicle terminal apparatus 140.

In this embodiment, the description will be given by using the connection processing wherein the communication line connection with the information server apparatus 110 is switched from the portable terminal apparatus 120 to the vehicle terminal apparatus 140, and thereafter, the communication line connection with the information server apparatus 110 is switched again to the portable terminal apparatus 120.

To be more specific, the connection is switched from the portable terminal apparatus 120 to the vehicle terminal apparatus 140 from the current location by way of the parking lot in which the vehicle 101 having the vehicle terminal apparatus 140 mounted thereon is parked, and the route guidance is further performed by switching from the vehicle terminal apparatus 140 to the portable terminal apparatus 120 by way of the parking lot in which the vehicle is to be parked in the neighborhood of the destination. However, it is assumed that the portable terminal apparatus 120 has already been started in the connection processing in the following route guidance.

Moreover, when performing the navigation, the portable terminal apparatus 120 allows a public transportation device such as a train and a bus to be utilized in addition to going to the destination by way of the parking lot, and so the operator may select any one of them. In this embodiment, it is selected to go to the destination by way of the parking lot, that is, in the vehicle 101 when performing the navigation.

In addition, when performing the route searching in this operation, a search is performed according to the portable terminal apparatus 120 and the vehicle terminal apparatus 140 for each of the route to the parking lot on the portable terminal apparatus 120, that is, to the location where the vehicle 101 is parked, the route from this parking lot to the parking lot in the destination on the vehicle terminal apparatus 140, and the route from this the parking lot in the destination to the destination.

Furthermore, when finishing the navigation, the vehicle terminal apparatus 140 constantly sends the vehicle position to the information server apparatus 110, and the information server apparatus 110 stores the information on the vehicle position (hereafter, referred to as vehicle position information) in a memory which is not shown. The vehicle position information is sent to the information server apparatus 110 when sending thereto stop information described later.

Furthermore, in this operation, the communication controlling data is comprised of the information on the instruction to perform the route searching, the instruction to change the communication line connection with the information server apparatus 110 to the portable terminal apparatus 120 and the vehicle terminal apparatus 140 and a request to change a sending destination, the start/stop information on the vehicle terminal apparatus 140, and the information acknowledging receipt of such information.

First, the operation of the connection processing of the entire navigation system 100 will be described by using FIG. 5.

First, if the operator performs a predetermined operation to start the navigation with the operation portion 131 of the portable terminal apparatus 120 and inputs the destination information, the portable terminal apparatus 120 establishes the communication line with the information server apparatus 110, and sends to the information server apparatus 110 the information on the instruction to perform the route searching (hereafter, referred to as searching instruction information) and the inputted destination information together with the current position information and movable body data of the portable terminal apparatus 120.

Next, the information server apparatus 110 having received the route searching instruction information performs the route searching based on the destination information, current position information and movable body data of the portable terminal apparatus 120, and sends to the portable terminal apparatus 120 the information on the route searching results (hereafter, referred to as searching result information) together with the navigation data such as the map information.

Moreover, in the information server apparatus 110, the route searching searches the route to the destination by way of the parking lot based on the vehicle position information stored in advance in a storing device such as the memory not shown. In addition, the information server apparatus 110 stores this searching result information in a storing device not shown.

Next, if the portable terminal apparatus 120 receives the route searching results, it displays the results in the display portion 125 together with the navigation data such as the map information so as to start the navigation process.

Hereafter, the information server apparatus 110 and the portable terminal apparatus 120 mutually send and receive the navigation data and movable body data so as to perform the route guidance of the portable terminal apparatus 120, that is, the operator to the destination (parking lot).

Thereafter, if the operator arrives at the parking lot and starts the engine of the vehicle 101, the vehicle terminal apparatus 140 is started and establishes the communication line with the portable terminal apparatus 120, and also sends thereto the start information, that is, the information to the effect that the navigation process will be switched.

Next, on receipt of this start information, the portable terminal apparatus 120 sends the information to the effect that it received the start information (hereafter, referred to as first receipt acknowledgement information) to the vehicle terminal apparatus 140, and it also sends to the information server apparatus 110 the information for switching the sending destination of the navigation data from the portable terminal apparatus 120 to the vehicle terminal apparatus 140, that is, for requesting a change of the sending destination (hereafter, referred to as change request information).

Next, on receipt of the change request information sent from the portable terminal apparatus 120, the information server apparatus 110 establishes the communication line with the vehicle terminal apparatus 140 and sends thereto the navigation data together with the information for instructing a change of the navigation process (hereafter, referred to as change instructing information).

Next, on receipt of the receipt acknowledgement information from the portable terminal apparatus 120 and also on receipt of the change information and the navigation data sent from the information server apparatus 10, the vehicle terminal apparatus 140 displays the navigation data such as the map information in the display portion 144 to start the navigation process and also sends the information to the effect that the receipt of the navigation data is possible (hereafter, referred to as second receipt acknowledgement information) to the information server apparatus 110.

Next, on receipt of the second receipt acknowledgement information from the vehicle terminal apparatus 140, the information server apparatus 110 mutually send and receive the navigation data and movable body data to and from the vehicle terminal apparatus 140 to perform the route guidance of the vehicle 101 to the destination, and also sends to the portable terminal apparatus 120 the information for instructing it to stop the navigation (hereafter, referred to as stop instructing information).

Next, on receipt of the stop instructing information, the portable terminal apparatus 120 stops the navigation process with the information server apparatus 110 and also disconnects the communication line.

Thus, the communication line connection with the information server apparatus 110 is switched from the portable terminal apparatus 120 to the vehicle terminal apparatus 140, and is changed from the portable terminal apparatus 120 to the vehicle 101, that is, the movable body to be the subject of the navigation.

On the other hand, in the case of arriving at the parking lot in the neighborhood of the destination and the engine of the vehicle 101 is stopped after the subject of the navigation is changed from the portable terminal apparatus 120 to the vehicle 101, the vehicle terminal apparatus 140 sends to the information server apparatus 110 the stop information of the vehicle terminal apparatus 140, that is, the information to the effect that the sending destination of the navigation data is changed, and stops the operation.

Next, on receipt of the change request information, the information server apparatus 110 connects the communication line with the portable terminal apparatus 120 again to send the change instructing information and also starts sending the navigation data.

Next, on receipt of the change instructing information, the portable terminal apparatus 120 starts the navigation process and also receives the navigation data to perform the navigation so as to display in the display portion 125 the navigation data such as the map information sent from the information server apparatus 110.

Hereafter, the information server apparatus 110 and the portable terminal apparatus 120 mutually send and receive the navigation data so as to perform the route guidance of the portable terminal apparatus 120, that is, the operator to the destination.

In addition, on receipt of the stop information from the vehicle terminal apparatus 140, the information server apparatus 110 finishes the navigating operation without communicating with the portable terminal apparatus 120 when determining that the distance from the parking lot to the destination is within a preset area.

Next, the operation of the connection processing on the information server apparatus 110 will be described by using FIG. 6.

First, the communication line with the portable terminal apparatus 120 is established. The route searching instruction information, inputted destination information and current position information of the portable terminal apparatus 120 are received by the information server apparatus 110 (step S11), and then the route searching is performed by the navigation processing portion 113 to send the searching result information to the portable terminal apparatus 120 (step S12), and also the navigation process with the portable terminal apparatus 120 is started (step S13).

Hereafter, the receiving portion 111 and the sending portion 115 mutually send and receive the navigation data to and from the portable terminal apparatus 120 so as to perform the route guidance of the portable terminal apparatus 120, that is, the operator to the destination. However, it is determined whether or not an instruction to stop the navigation process is inputted from the portable terminal apparatus 120 or the like during this navigation process, and this operation is finished in the case the stop instruction is inputted (step S14).

On the other hand, during the navigation process, the system controlling portion 114 determines as to the change request information sent from the portable terminal apparatus 120, that is, whether or not the portable terminal apparatus 120 received the start information indicating that the engine of the vehicle 101 was started (step S15), and the following operation is performed in the case where the change request information was received.

First, the system controlling portion 114 controls the respective portions so that the information server apparatus 110 switches the communication line connection to the vehicle terminal apparatus 140, and sends to the information server apparatus 110 the information for switching the sending destination of the navigation data from the portable terminal apparatus 120 to the vehicle terminal apparatus 140, that is, the change instructing information for changing the sending destination is sent to the vehicle terminal apparatus 140 (step S16).

Next, it is determined by the system controlling portion 114 whether or not the second receipt acknowledgement information sent from the vehicle terminal apparatus 140 was received (step S17), and the stop instructing information is sent to the portable terminal apparatus 120 in the case where the second receipt acknowledgement information was received (step S18).

Thereafter, the system controlling portion 114 sends and receives the navigation data and movable body data to and from the vehicle terminal apparatus 140 to perform the navigation of the vehicle 101 on which it is mounted until the vehicle terminal apparatus 140 stops (step S19). In this case, the system controlling portion 114 constantly determines whether or not the stop information from the vehicle terminal apparatus 140 was received (step S20).

And if the stop information is received by the system controlling portion 114, the change instructing information is sent to the portable terminal apparatus 120, and the navigation data and movable body data are sent to and received from the portable terminal apparatus 120 so as to restart the navigation process thereof (step S21).

Next, the operation of the connection processing on the portable terminal apparatus 120 will be described by using FIG. 7.

First, the operator performs the predetermined operation for starting the navigation with the operation portion 131 and inputs the destination information, and then the system controlling portion 130 establishes the communication line with the information server apparatus 110 to send thereto the searching instruction information for the route searching, the inputted destination information and the current position information of the portable terminal apparatus 120 (step S31).

Next, if the system controlling portion 130 receives the searching result information on the route searching together with the navigation data such as the map information sent from the information server apparatus 110 via the receiving portion 121 (step S32), it displays the navigation data and the searching result information in the display portion 125 (step S33) to start the navigation process (step S34).

Hereafter, the system controlling portion 130 and the information server apparatus 110 mutually send and receive the navigation data and movable body data between them so as to perform the route guidance of the portable terminal apparatus 120, that is, the operator to the destination. However, it is determined whether or not an instruction to stop the navigation process is inputted by the operation portion 131 or the like during this navigation process, and this operation is finished in the case where the stop instruction is inputted (step S35).

On the other hand, during the navigation process, the system controlling portion 130 determines whether or not the start information on the vehicle terminal apparatus 140 was received (step S36), and the following operation is performed in the case where it was received.

First, the system controlling portion 130 controls the respective portions to switch the communication line connection with the information server apparatus 110 to the vehicle terminal apparatus 140, and sends to the vehicle terminal apparatus 140 the first receipt acknowledgement information to the effect that the start information was received, and also sends to the information server apparatus 110 the change instructing information for changing the sending destination of the navigation data from the portable terminal apparatus 120 to the vehicle terminal apparatus 140 (step S37).

Next, it is determined whether or not the information instructing to stop the navigation process was received by the system controlling portion 130 (step S38). And the navigation process of the portable terminal apparatus 120 is stopped in the case where the information was received by the system controlling portion 130 (step S39).

Thereafter, the portable terminal apparatus 120 remains stopped until it receives the change instructing information for starting the navigation process and the navigation data. In this case, the system controlling portion 130 constantly determines whether or not the change instructing information was received from the information server apparatus 110 (step S40). In the case where the information was received, the system controlling portion 130 establishes the communication line with the information server apparatus 110 again, and performs the navigation process based on the navigation data sent together with the change instructing information so as to display the navigation data in the display portion 125 (step S41).

Hereafter, the information server apparatus 110 and the portable terminal apparatus 120 mutually send and receive the navigation data and movable body data so as to perform the route guidance of the portable terminal apparatus 120, that is, the operator to the destination. And the navigation process ends on arrival at the destination.

Next, the operation of the connection processing on the vehicle terminal apparatus 140 will be described by using FIG. 8.

First, when the navigation of the portable terminal apparatus 120 is performed by the information server apparatus 110 and the portable terminal apparatus 120, the operator arrives at the parking lot and starts the engine of the vehicle 101 (step S51), and the vehicle terminal apparatus 140 is started (step S52).

Next, the system controlling portion 147 establishes the communication line with the portable terminal apparatus 120, and sends thereto the start information, that is, the information to the effect that the navigation process will be switched (step S53).

Next, the system controlling portion 147 determines whether or not the first receipt acknowledgement information from the portable terminal apparatus 120 was received and whether or not the change instructing information sent from the information server apparatus 110 was received respectively (step S54, step S55). If the first receipt acknowledgement information is received and the change instructing information and the navigation data are also received, the system controlling portion 147 displays the navigation data such as the map information in the display portion 144 to start the navigation process (step S56).

Next, the system controlling portion 147 sends to the information server apparatus 110 the second receipt acknowledgement information to the effect that it is possible to receive the navigation data (step S57).

Thereafter, the system controlling portion 147 constantly determines whether or not the engine of the vehicle 101 is stopped (step S58), and in the case where the vehicle 101 arrives at the parking lot in the neighborhood of the destination and the engine thereof is stopped, the system controlling portion 147 sends to the information server apparatus 110 the stop information of the vehicle terminal apparatus 140, that is, the information to the effect that the sending destination of the navigation data is changed, and stops the operation (step S59).

According to this embodiment described above, the data on the navigation before switching can be continuously used on the switched communication terminal apparatus, and so the route searching information or the destination information can be continuously used and the navigation such as the route searching and route guidance can be continuously performed in the case of having changed the portable terminal apparatus 120 to the vehicle 101, that is, the movable body to another movable body before arriving at the destination.

Accordingly, it is possible to accurately guide the user to the destination without necessity to perform the troublesome operation such as setting data for performing the navigation when the movable body is changed.

According to this embodiment, it is possible to switch between the terminal apparatuses 120 and 140 for performing the navigation based on the start and stop of the vehicle terminal apparatus 140, and also to connect to or disconnect from the information server apparatus 110 based on the start and stop of the engine of the vehicle 101 on which the vehicle terminal apparatus 140 is mounted.

Moreover, in the case of switching the connection with the information server apparatus from the portable terminal apparatus to the vehicle terminal apparatus and thereby changing the movable body to be the subject of the navigation in this embodiment, the portable terminal apparatus and the vehicle terminal apparatus are supposed to mutually send and receive the information for switching the connection. However, it is also possible to switch the connection with the information server apparatus by communicating with this information server without mutually performing the communication between the portable terminal apparatus and the vehicle terminal apparatus.

In this case, each switching instruction and the information acknowledging receipt thereof are sent to each portable terminal apparatus and vehicle terminal apparatus via the information server apparatus.

To be more specific, the information sent from the vehicle terminal apparatus to the effect that the vehicle terminal apparatus has started and that it has stopped and also the information sent from the portable terminal apparatus to the effect that the vehicle terminal apparatus has started are sent to each portable terminal apparatus and vehicle terminal apparatus via the information server apparatus.

In addition, while one information server apparatus performs the communication with the portable terminal apparatus and the vehicle terminal apparatus respectively to navigate the portable terminal apparatus or the vehicle terminal apparatus, it is also feasible to navigate the portable terminal apparatus and the vehicle terminal apparatus with different information server apparatuses.

Figure 9:
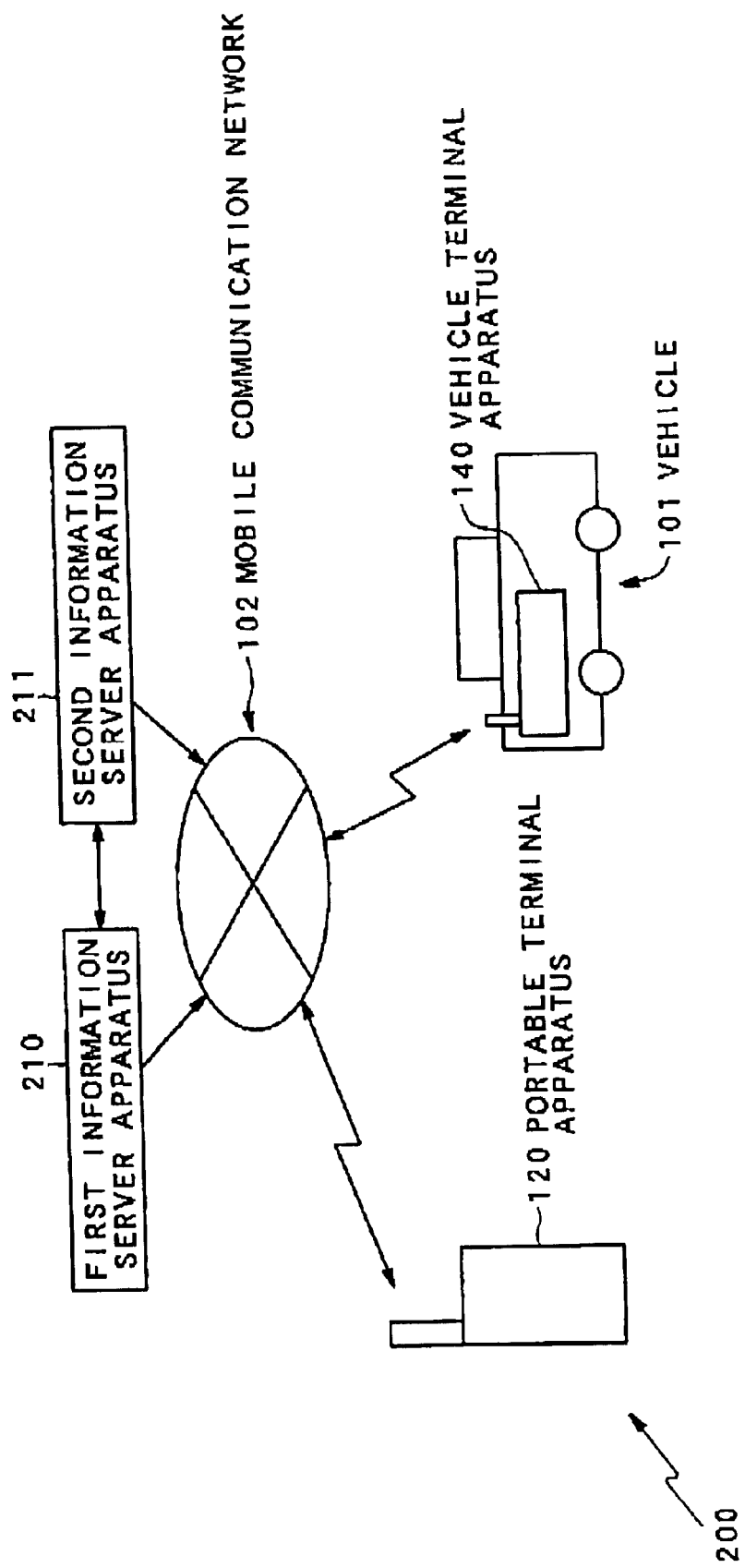
FIG. 9 is a block diagram showing an overview configuration of the navigation system according to another embodiment related to the present invention.

In this case, the information server apparatuses are mutually connected by the communication line such as the public switched telephone network circuit as shown in FIG. 9 so as to send and receive the navigation data.

In this case, the navigation system performs the operation of the connection processing as shown in FIG. 10.

FIG. 10 is a sequence diagram showing the processes of the apparatuses, that is, a first information server apparatus 210 and a second information server apparatus 211, and the portable terminal apparatus 120 and the vehicle terminal apparatus 140, where the same operation of the connection processing as the above-mentioned operation is performed by the portable terminal apparatus 120 and the vehicle terminal apparatus 140.

First, if the operator performs the predetermined operation for starting the navigation with the operation portion 131 of the portable terminal apparatus 120 and inputs the destination information, the portable terminal apparatus 120 establishes the communication line with the first information server 210 and sends thereto the route searching instruction information and the inputted destination information together with the current position information and movable body data of the portable terminal apparatus 120.

Next, the first information server apparatus 210 having received the route searching instruction information performs the route searching based on the destination information, current position information and movable body data of the portable terminal apparatus 120, and sends to the portable terminal apparatus 120 the route searching results together with the navigation data such as the map information.

Next, on receipt of this route searching results, the portable terminal apparatus 120 displays the route searching results together with the navigation data such as the map information in the display portion 125 so as to start the navigation process.

Hereafter, the first information server apparatus 210 and the portable terminal apparatus 120 mutually send and receive the navigation data so as to perform the route guidance of the portable terminal apparatus 120, that is, the operator to the destination (parking lot).

Thereafter, if the operator arrives at the destination and starts the engine of the vehicle 101, the vehicle terminal apparatus 140 is started and establishes the communication line with the portable terminal apparatus 120, and sends to the portable terminal apparatus 120 the start information, that is, the information for switching the navigation process.

Next, on receipt of this start information, the portable terminal apparatus 120 sends the first receipt acknowledgement information to the vehicle terminal apparatus 140 and also sends the change request information to the first information server apparatus 210.

Next, on receipt of the sending destination change request information on the navigation data sent from the portable terminal apparatus 120, the first information server apparatus 210 sends the navigation data such as the destination information and the route searching results to the second information server apparatus 211 for performing the communication with the vehicle terminal apparatus 140, and also sends the communication controlling data for changing the navigation process to the vehicle terminal apparatus 140.

Next, the second information server apparatus 211 establishes the communication line for performing the navigation process with the vehicle terminal apparatus 140, and sends to the vehicle terminal apparatus 140 the information to that effect.

On the other hand, if the vehicle terminal apparatus 140 receives the first receipt acknowledgement information on the portable terminal apparatus 120 and also receives the change information and the navigation data sent from the second information server apparatus 211, the vehicle terminal apparatus 140 displays in the display portion 144 the navigation data such as the map information sent from the second information server apparatus 211 to start the navigation process and sends the second receipt acknowledgement information to the second information server apparatus 211.

Next, on receipt of the second receipt acknowledgement information, the second information server apparatus 211 sends to and receives from the vehicle terminal apparatus 140 the navigation data and movable body data so as to perform the route guidance of the vehicle 101 to the destination and also send the navigation stop instructing information to the first information server apparatus 210.

Next, the first information server apparatus 210 sends the navigation stop instructing information to the portable terminal apparatus 120.

Next, on receipt of the navigation stop instructing information, the portable terminal apparatus 120 stops the navigation process.

Thus, the communication system for performing the navigation process is switched from the portable terminal apparatus 120 and the first information server apparatus 210 to the vehicle terminal apparatus 140 and the second information server apparatus 211, and the portable terminal apparatus 120, that is, the movable body to be the subject of the navigation, is changed to the vehicle 101.

In addition, in the case of arriving at the parking lot in the neighborhood of the destination and having the engine of the vehicle 101 stopped after the subject of the navigation is changed from the portable terminal apparatus 120 to the vehicle 101, the vehicle terminal apparatus 140 sends to the second information server apparatus 211 the sending destination change request information on the navigation data and stops the operation.

Next, on receipt of the sending destination change request information on the navigation data, the second information server apparatus 211 sends the navigation data to the first information server apparatus 210, which starts sending the navigation data to the portable terminal apparatus 120.

Next, on receipt of the navigation data, the portable terminal apparatus 120 starts the navigating operation, and displays the navigation data such as the map information sent from the information server apparatus 110 in the display portion 125.

Hereafter, the first information server apparatus 210 and the portable terminal apparatus 120 mutually send and receive the navigation data so as to perform the route guidance of the portable terminal apparatus 120, that is, the operator to the destination.

As mentioned above, in the case of changing the movable body to be the subject of the navigation by switching the connections with the information server apparatuses 210 and 211 from the portable terminal apparatus 120 to the vehicle terminal apparatus 140, the portable terminal apparatus 120 and the vehicle terminal apparatus 140 mutually send and receive the information to the effect that the connections are switched. However, it is also feasible, via the information server apparatuses 210, 211 and with no communication mutually performed between the portable terminal apparatus 120 and the vehicle terminal apparatus 140, to switch the connections between the portable and vehicle terminal apparatuses 120, 140 and the information server apparatuses 210, 211.

In the case of performing the navigation, for each of the information server apparatuses 210 and 211, with the terminal apparatuses 120 and 140 for performing the communication therewith, the searching result information, navigation data and destination information before switching can be continuously used on the switched terminal apparatuses 120 and 140, and so it is possible to accurately guide the user to the destination without necessity to perform the troublesome operation such as setting data for performing the navigation when the movable body is changed (when changing from the portable terminal apparatus 120 to the vehicle terminal apparatus 140 or vice versa).

In addition, when performing the route searching in this embodiment, a search is performed according to the terminal apparatuses 120 and 140 for each of the route to the parking lot on the portable terminal apparatus 120, that is, to the location where the vehicle 101 is parked, the route from this parking lot to the parking lot in the destination on the vehicle terminal apparatus 140, and the route from this parking lot in the destination to the destination so as to store them in a memory not shown. However, it is also possible, without storing them in the memory not shown, to perform the route searching when starting the navigation with the terminal apparatuses 120 and 140 respectively.

To be more specific, it is also possible to perform the route searching from the location where the vehicle is parked to the parking lot in the destination when the navigation is switched from the portable terminal apparatus 120 to the vehicle terminal apparatus 140, and the route searching from the parking lot in the destination to the destination when the navigation is switched from the vehicle terminal apparatus 140 to the portable terminal apparatus 120 respectively.

According to this embodiment, the information server apparatuses 110, 210, 211, the portable terminal apparatus 120 and the vehicle terminal apparatus 140 are comprised of the above portions. However, it is also feasible to provide a computer and a record medium such as a hard disk to the system controlling portions 114, 130 and 147 of each of the information server apparatuses, portable terminal apparatus and vehicle terminal apparatus to store a program for performing the above process corresponding to the portions of these apparatuses in the record medium and have the program read by the computer so as to perform the operation of the above portions of each of these apparatuses.

When performing the above-mentioned connection processing in this case, it is performed by operating the respective computers in synchronization by each program. In this case, the system controlling portions 114, 130 and 147 constitute the connection controlling device, sending device and receiving device related to the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein, The entire disclosure of Japanese Patent Application No. 2001-304362 filed on Sep. 28, 2001 and Japanese Patent Application No. 2001-274184 filed on Sep. 10, 2001 including the specification, claims, drawings and summary is incorporated herein by reference in its entirety.

What is claimed is:

1. A navigation system comprising a fixedly installed information server apparatus and communication terminal apparatuses mounted one by one on a plurality of movable bodies for communicating with the information server apparatus via a mobile communication network, the system changing the movable bodies performing navigation by switching a connection between each of the communication terminal apparatuses and the information server apparatus, wherein the information server apparatus comprises, a receiving device for receiving information notifying at least either a start or a stop of any one of the plurality of communication terminal apparatuses;

a connection controlling device for, based on the received information, performing at least any one of: connecting, as the communication terminal apparatus mounted on the movable body to be a subject of the navigation, any one of the communication terminal apparatuses to the information server apparatus; and disconnecting the communication terminal apparatus from the information server apparatus; and when one connection between one communication terminal apparatus and the information server apparatus is switched to another connection between another communication terminal apparatus and the information server apparatus, data, which is inherited from the one communication terminal apparatus and the information server apparatus in the one connection, is continuously used during the switched another connection.

2. The navigation system according to claim 1, wherein the system comprises a plurality of the information server apparatuses mutually connected; and each of the communication terminal apparatuses performs communication with any one of the information server apparatuses and also performs the navigation of the movable body, on which the connected communication terminal apparatus is mounted, by connecting to the information server apparatus for performing the communication.

3. The navigation system according to claim 1, wherein the data includes at least any one of route searching data and destination data.

4. The navigation system according to claim 1, wherein the plurality of communication terminal apparatuses at least includes a vehicle communication terminal apparatus and a portable communication terminal apparatus.

5. The navigation system according to claim 4, wherein a communication terminal apparatus to be a starting point of switching of the communication terminal apparatuses by the information server apparatus is the vehicle communication terminal apparatus.

6. The navigation system according to claim 4, wherein:
in the case where the communication terminal apparatus is the vehicle communication terminal apparatus, the vehicle communication terminal apparatus comprises a sending device for at least sending information to notify the information server apparatus of a start of the vehicle communication terminal apparatus; and based on an engine start of a vehicle on which the vehicle communication terminal apparatus is mounted, the sending device sends the information to notify the start.

7. The navigation system according to claim 6, wherein in the case where the receiving device in the information server apparatus receives the information to notify the start of the vehicle communication terminal apparatus, the connection controlling device connects the vehicle communication terminal apparatus to the information server apparatus and disconnects other communication terminal apparatuses from the information server apparatus.

8. The navigation system according to claim 4, wherein:
in the case where the communication terminal apparatus is the vehicle communication terminal apparatus, the vehicle communication terminal apparatus has a sending device for at least sending information to notify the information server apparatus of a stop of the vehicle communication terminal apparatus; and based on an engine stop of a vehicle on which the vehicle communication terminal apparatus is mounted, the sending device sends the information to notify the stop.

9. The navigation system according to claim 8, wherein in the case where the receiving device in the information server apparatus receives the information to notify the stop of the vehicle communication terminal apparatus, the connection controlling device disconnects the vehicle communication terminal apparatus from the information server apparatus and connects one of the other communication terminal apparatuses to the information server apparatus.

10. An information server apparatus included in a navigation system comprising a fixedly installed information server apparatus and communication terminal apparatuses mounted one by one on a plurality of movable bodies for communicating with the information server apparatus via a mobile communication network, the system changing the movable bodies performing navigation by switching a connection between each of the communication terminal apparatuses and the information server apparatus, wherein the information server apparatus comprises;

a receiving device for receiving information notifying at least either a start or a stop of any one of the plurality of communication terminal apparatuses;

a connection controlling device for, based on the received information, performing at least any one of: connecting, as the communication terminal apparatus mounted on the movable body to be a subject of the navigation, any one of the communication terminal apparatuses to the information server apparatus; and disconnecting the communication terminal apparatus from the information server apparatus; and when one connection between one communication terminal apparatus and the information server apparatus is switched to another connection between another communication terminal apparatus and the information server apparatus, data, which is inherited from the one communication terminal apparatus and the information server apparatus in the one connection, is continuously used during the switched another connection.

11. The information server apparatus for the navigation system according to claim 10, wherein the apparatus is included in the navigation system including:

a plurality of the information server apparatuses mutually connected, and each of the communication terminal apparatuses performs communication with any one of the information server apparatuses and thereby performs the navigation of any one of the plurality of movable bodies; and in the case where the communication terminal apparatus of which connection is to be switched by the connection controlling device is the one for performing the communication with another information server apparatus, the connection controlling device connects the communication terminal apparatus to said another information server apparatus.

12. The information server apparatus according to claim 10, wherein the data at least includes either route searching data or destination data.

13. A communication terminal apparatus included in a navigation system having a fixedly installed information server apparatus and communication terminal apparatuses mounted one by one on a plurality of movable bodies for communicating with the information server apparatus via a mobile communication network, the system changing the movable bodies performing navigation by switching a connection between each of the communication terminal apparatuses and the information server apparatus, wherein the communication terminal apparatus comprises a sending device for, on starting or stopping, sending to at least any one of the information server apparatus and one communication terminal apparatus switching information for switching one connection between the one communication terminal apparatus and the information server apparatus to another connection between another communication terminal apparatus, and wherein, in the case where the one connection is switched to said another connection, said another communication terminal apparatus performs the navigation based on data inherited from the one communication terminal apparatus and the information server apparatus in the one connection.

14. The communication terminal apparatus according to claim 13, wherein the communication terminal apparatus is a vehicle communication terminal apparatus.

15. The communication terminal apparatus according to claim 13, wherein the data includes at a least any one of route searching data and destination data.

16. A communication terminal apparatus included in a navigation system comprising a fixedly installed information server apparatus and communication terminal apparatuses mounted one by one on a plurality of movable bodies for communicating with the information server apparatus via a mobile communication network, the system changing the movable bodies performing navigation by switching a connection between each of the communication terminal apparatuses and the information server apparatus, wherein the communication terminal apparatus comprises:

a receiving device for receiving information notifying at least either a start or a stop of the other communication terminal apparatus;

a sending device for, on receiving the information, sending to at least any one of the information server apparatus and one communication terminal apparatus switching information for switching one connection between the one communication terminal apparatus and the information server apparatus to another connection between another communication terminal apparatus and the information server apparatus, and performs the navigation based on data inherited from the one communication terminal apparatus and the information server apparatus in the one connection.

17. The communication terminal apparatus according to claim 16, wherein the communication terminal apparatus is a portable communication terminal apparatus.

18. A method of changing a movable body in a navigation system comprising a fixedly installed information server apparatus and communication terminal apparatuses mounted one by one on a plurality of movable bodies for communicating with the information server apparatus via a mobile communication network, the system changing the movable bodies performing navigation by switching a connection between each of the communication terminal apparatuses and the information server apparatus, wherein the method includes:

a notification process of notifying the information server apparatus of information on either a start or stop of any one of the plurality of communication terminal apparatuses;

a connection process of performing at least any one of: connecting, as the communication terminal apparatus mounted on the movable body to be a subject of the navigation, any one of the communication terminal apparatuses to the information server apparatus; and disconnecting the communication terminal apparatus from the information server apparatus; and when one connection between one communication terminal apparatus and the information server apparatus is switched to another connection between another communication terminal apparatus and the information server apparatus, data, which is inherited from the one communication terminal apparatus and the information server apparatus in the one connection, is continuously used during the switched another connection.

19. The method of changing the movable body in the navigation system according to claim 18, wherein;

the information server apparatus comprises a plurality of the information server apparatuses mutually connected for performing communication, and the communication terminal apparatuses performs the communication with any one of the information server apparatuses;

the notification process notifies at least any one of the plurality of information server apparatus of information on either a start or stop of any one of the plurality of communication terminal apparatuses; and the connection process, based on the information, performs any one of: connecting, as the communication terminal apparatus mounted on the movable body to be a subject of the navigation, any one of the communication terminal apparatuses to the information server apparatus to be connected therewith or disconnecting the communication terminal apparatus from the information server apparatus connected therewith.

20. The method of changing the movable body in the navigation system according to claim 18, wherein the data includes at least any one of route searching data and destination data.

21. The method of changing the movable body in the navigation system according to claim 18, wherein the communication terminal apparatus for notifying the information by the notification step and connecting to or disconnecting from the information server apparatus by the connection step is at least a vehicle communication terminal apparatus and a portable communication terminal apparatus.

22. The method of changing the movable body in the navigation system according to claim 21, wherein the communication terminal apparatus for notifying the information by the notification step is the vehicle communication terminal apparatus.

23. A program, embodied in a recording medium, for changing by a computer a movable body in a navigation system comprising a fixedly installed information server apparatus and communication terminal apparatuses mounted one by one on a plurality of movable bodies for communicating with the information server apparatus via a mobile communication network, the system changing the movable bodies performing navigation by switching a connection between each of the communication terminal apparatuses and the information server apparatus, wherein the program causes the computer to function as:

a receiving device for receiving information notifying at least either a start or a stop of any one of the plurality of communication terminal apparatuses;

a connection controlling device for, based on the received information, performing at least any one of: connecting, as the communication terminal apparatus mounted on the movable body to be a subject of the navigation, any one of the communication terminal apparatuses to the information server apparatus; and disconnecting the communication terminal apparatus from the information server apparatus; and when one connection between one communication terminal apparatus and the information server apparatus is switched to another connection between another communication terminal apparatus and the information server apparatus, data, which is inherited from the one communication terminal apparatus and the information server apparatus in the one connection, is continuously used during the switched another connection.

24. The program for changing the movable body in the navigation system according to claim 23, wherein:

the information server apparatus comprises a plurality of the information server apparatuses mutually connected for performing communication, and the communication terminal apparatus performs the communication with any one of the information server apparatuses; and the program further causes the computer to function as a connection controlling device for performing at least any one of: connecting, as the communication terminal apparatus mounted on the movable body to be a subject of the navigation, any one of the communication terminal apparatuses to the information server apparatus to be connected therewith; and disconnecting the communication terminal apparatus from the information server apparatus connected therewith.

25. The program for changing the movable body in the navigation system according to claim 23, wherein the data at least includes either route searching data or destination data.

26. The program for changing the movable body in the navigation system according to claim 23, wherein:

the communication terminal apparatuses at least include a vehicle communication terminal apparatus and a portable communication terminal apparatus; and the program further causes the computer to function as a receiving device for receiving information notifying at least either a start or a stop of the vehicle communication terminal apparatus and a connection controlling device for, based on the received information, performing at least any one of: connecting, as the communication terminal apparatus mounted on the movable body to be a subject of the navigation, either the vehicle communication terminal apparatus or the portable communication terminal apparatus to the information server apparatus; and disconnecting the vehicle communication terminal apparatus and the portable communication terminal apparatus from the information server apparatus.

27. A navigation system comprises:

a first navigation device which is portable and has a first communication device;

a second navigation device which is installed in a mobile body and has a second communication device; and a server which is connected to the first and second communication devices and transmits navigation data for either of the first navigation device and the second navigation device, wherein, before turning off, the first navigation device transmits navigation data that is used while the first navigation device is performing to the server, and wherein the second navigation device receives the navigation data from the server after turning on and starts performing navigation based on the navigation data.

28. The system according to claim 27, wherein the server comprises a first server, which communicates with the first navigation device, and a second server, which communicates with the second navigation device.

29. The system according to claim 28, wherein the first server forwards the navigation data to the second server.

* * * * *